United States Patent
Bastian, II et al.

(10) Patent No.: US 10,495,764 B2
(45) Date of Patent: Dec. 3, 2019

(54) ASSET TRACKING SYSTEM

(71) Applicant: Bastian Solutions, LLC, Indianapolis, IN (US)

(72) Inventors: William A. Bastian, II, Carmel, IN (US); Carlos Lemus, Carmel, IN (US); Logan Wendholt, Carmel, IN (US)

(73) Assignee: Bastian Solutions, LLC, Indianapolis, IN (US)

(*) Notice: Subject to any disclaimer, the term of this patent is extended or adjusted under 35 U.S.C. 154(b) by 0 days.

(21) Appl. No.: 15/883,697

(22) Filed: Jan. 30, 2018

(65) Prior Publication Data
US 2019/0235092 A1    Aug. 1, 2019

(51) Int. Cl.
| | |
|---|---|
| *G01S 19/48* | (2010.01) |
| *G06Q 50/28* | (2012.01) |
| *G01G 3/13* | (2006.01) |
| *B65D 19/00* | (2006.01) |
| *G01P 15/00* | (2006.01) |
| *H02N 2/18* | (2006.01) |

(52) U.S. Cl.
CPC .......... *G01S 19/48* (2013.01); *B65D 19/0055* (2013.01); *G01G 3/13* (2013.01); *G01P 15/00* (2013.01); *G06Q 50/28* (2013.01); *B65D 2519/00293* (2013.01); *B65D 2519/00542* (2013.01); *H02N 2/18* (2013.01)

(58) Field of Classification Search
CPC ......... G01S 19/48; H04W 4/02; H04W 4/029; Y02D 70/00; Y02D 70/144; Y02D 70/164; B65D 19/0055; G01G 3/13; G01P 15/00; G06Q 50/28
See application file for complete search history.

(56) References Cited

U.S. PATENT DOCUMENTS

| | | |
|---|---|---|
| 5,917,423 A | 6/1999 | Duvall |
| 6,229,988 B1 | 5/2001 | Stapefeld et al. |
| (Continued) | | |

FOREIGN PATENT DOCUMENTS

WO    WO 2017/082812 A1    5/2017

OTHER PUBLICATIONS

American Security Logistics Launches AT&T Connected Tracking Device for Ground Based Cargo Shipments. Logistics Online. Sep. 13, 2010. 5 pages. Retrieved from the Internet: <URL: http://www.logisticsonline.com/doc/american-security-logistics-launches-0001>.

(Continued)

*Primary Examiner* — Orlando Bousono
(74) *Attorney, Agent, or Firm* — Woodard, Emhardt, Henry, Reeves & Wagner, LLP

(57) ABSTRACT

An inventory tracking system includes a tracking device coupled to a transport structure that is designed to carry items. The tracking device includes a processor as well as several modules operatively connected to the processor for determining the location of the transport structure. The tracking device determines location using a short-range communication module when the tracking device is within a storage facility. When outside of the storage facility, the tracking device determines a location of the transport structure using a satellite navigation module. A mobile communication module is used to determine the location of the transport structure if neither the short-range communication module nor the satellite navigation module is successful.

35 Claims, 27 Drawing Sheets

(56) References Cited

U.S. PATENT DOCUMENTS

| | | | |
|---|---|---|---|
| 6,266,008 B1 | 7/2001 | Huston et al. | |
| 6,339,397 B1 | 1/2002 | Baker | |
| 6,483,434 B1 | 11/2002 | UmiKer | |
| 6,665,613 B2 | 12/2003 | Duvall | |
| 6,826,514 B1 | 11/2004 | Antico et al. | |
| 6,847,825 B1 | 1/2005 | Duvall et al. | |
| 6,876,858 B1 | 4/2005 | Duvall et al. | |
| 6,972,682 B2 | 12/2005 | Lareau et al. | |
| 6,975,224 B2 | 12/2005 | Galley, III et al. | |
| 6,977,612 B1 | 12/2005 | Bennett | |
| 7,005,968 B1 | 2/2006 | Bridgelall | |
| 7,136,832 B2 | 11/2006 | Li et al. | |
| 7,342,496 B2 | 3/2008 | Muirhead | |
| 7,714,708 B2 | 5/2010 | Brackmann et al. | |
| 7,751,829 B2 | 7/2010 | Masuoka et al. | |
| 7,761,681 B2 | 7/2010 | Jewell et al. | |
| 7,768,393 B2 | 8/2010 | Nigam | |
| 7,830,852 B2 | 11/2010 | Twitchell, Jr. | |
| 8,223,009 B2 | 7/2012 | Anderson et al. | |
| 8,314,704 B2 | 11/2012 | Cova et al. | |
| 8,630,605 B2 | 1/2014 | Meacci et al. | |
| 8,659,420 B2 | 2/2014 | Salvat, Jr. | |
| 8,830,124 B1 | 9/2014 | Akbari et al. | |
| 9,008,995 B2 | 4/2015 | Lee et al. | |
| 9,020,527 B2 | 4/2015 | Lee et al. | |
| 9,633,327 B2 | 4/2017 | Hamm et al. | |
| 9,752,840 B1* | 9/2017 | Betro | H04W 4/029 |
| 2002/0099567 A1 | 7/2002 | Joao | |
| 2002/0177476 A1* | 11/2002 | Chou | G01S 5/0027 |
| | | | 455/574 |
| 2004/0198309 A1 | 10/2004 | Duvall | |
| 2005/0017899 A1* | 1/2005 | Cervinka | G08B 25/08 |
| | | | 342/357.31 |
| 2005/0171854 A1 | 8/2005 | Lyon | |
| 2005/0174235 A1 | 8/2005 | Davis et al. | |
| 2005/0253703 A1* | 11/2005 | He | G01S 5/02 |
| | | | 340/539.13 |
| 2007/0247366 A1* | 10/2007 | Smith | G01S 5/021 |
| | | | 342/464 |
| 2008/0004798 A1* | 1/2008 | Troxler | A01K 15/023 |
| | | | 702/187 |
| 2008/0036661 A1* | 2/2008 | Smith | G01S 5/021 |
| | | | 342/464 |
| 2008/0042901 A1* | 2/2008 | Smith | G01S 5/021 |
| | | | 342/464 |
| 2008/0048914 A1* | 2/2008 | Smith | G01S 5/021 |
| | | | 342/464 |
| 2008/0055158 A1* | 3/2008 | Smith | G01S 5/021 |
| | | | 342/464 |
| 2008/0103944 A1 | 5/2008 | Hagemann et al. | |
| 2009/0061897 A1* | 3/2009 | Hamilton | G06Q 10/08 |
| | | | 455/456.2 |
| 2009/0315767 A1 | 12/2009 | Scalisi et al. | |
| 2010/0039317 A1* | 2/2010 | Cameron | G06Q 10/08 |
| | | | 342/357.52 |
| 2010/0052991 A1* | 3/2010 | Smith | G01S 5/021 |
| | | | 342/451 |
| 2010/0073235 A1* | 3/2010 | Smith | G01S 5/021 |
| | | | 342/451 |
| 2010/0090901 A1* | 4/2010 | Smith | G01S 5/021 |
| | | | 342/451 |
| 2010/0289659 A1 | 11/2010 | Verbil | |
| 2011/0066398 A1* | 3/2011 | Troxler | A01K 15/023 |
| | | | 702/150 |
| 2012/0083705 A1* | 4/2012 | Yuen | A61B 5/0002 |
| | | | 600/508 |
| 2012/0158354 A1* | 6/2012 | Troxler | A01K 15/023 |
| | | | 702/150 |
| 2012/0161958 A1* | 6/2012 | Turon | G01S 19/34 |
| | | | 340/539.3 |
| 2012/0252501 A1 | 10/2012 | Smith et al. | |
| 2013/0012234 A1* | 1/2013 | Tufty | H04W 4/029 |
| | | | 455/456.3 |
| 2013/0070636 A1* | 3/2013 | Farley | H04L 67/12 |
| | | | 370/254 |
| 2013/0226511 A1* | 8/2013 | Troxler | A01K 15/023 |
| | | | 702/150 |
| 2013/0271281 A1 | 10/2013 | Jessop | |
| 2013/0321122 A1 | 12/2013 | Lee et al. | |
| 2014/0018001 A1* | 1/2014 | Nakra | G06Q 10/0833 |
| | | | 455/41.2 |
| 2014/0210614 A9 | 7/2014 | Muirhead | |
| 2014/0235188 A1* | 8/2014 | Lee | H01M 10/465 |
| | | | 455/127.5 |
| 2014/0274225 A1* | 9/2014 | Lacatus | H04W 24/08 |
| | | | 455/574 |
| 2014/0370909 A1* | 12/2014 | Natucci, Jr. | H04W 52/0251 |
| | | | 455/456.1 |
| 2015/0088452 A1* | 3/2015 | Troxler | A01K 15/023 |
| | | | 702/150 |
| 2015/0119069 A1* | 4/2015 | Harris | G01S 5/0205 |
| | | | 455/456.1 |
| 2015/0119070 A1* | 4/2015 | Harris | G01S 5/0205 |
| | | | 455/456.1 |
| 2015/0237419 A1* | 8/2015 | Lee | H04Q 9/00 |
| | | | 340/870.02 |
| 2015/0264647 A1* | 9/2015 | Lacatus | H04W 24/08 |
| | | | 455/574 |
| 2015/0296332 A1* | 10/2015 | Lee | G06K 19/0723 |
| | | | 340/8.1 |
| 2015/0319687 A1* | 11/2015 | Farley | H04L 67/12 |
| | | | 370/311 |
| 2016/0105764 A1* | 4/2016 | Evans | H04W 4/02 |
| | | | 340/539.13 |
| 2016/0105765 A1* | 4/2016 | Farley | H04W 64/00 |
| | | | 455/456.1 |
| 2016/0105766 A1* | 4/2016 | de la Broise | H04W 4/02 |
| | | | 455/456.1 |
| 2016/0110976 A1* | 4/2016 | Mains, Jr. | G08B 13/2434 |
| | | | 340/572.8 |
| 2016/0238406 A1* | 8/2016 | Burtner | G06F 16/22 |
| 2016/0307433 A1* | 10/2016 | Hanggi | G08B 21/24 |
| 2017/0019769 A1 | 1/2017 | Li | |
| 2017/0064499 A1* | 3/2017 | Farley | H04W 64/00 |
| 2017/0064509 A1* | 3/2017 | Evans | H04W 4/02 |
| 2017/0129603 A1* | 5/2017 | Raptopoulos | B64C 39/024 |
| 2017/0178064 A1* | 6/2017 | Olejak | G06Q 10/087 |
| 2017/0201857 A1* | 7/2017 | de la Broise | H04W 4/02 |
| 2017/0208426 A1* | 7/2017 | Komoni | G08C 17/02 |
| 2017/0269220 A1* | 9/2017 | Turon | G01S 19/34 |
| 2017/0301220 A1* | 10/2017 | Jarrell | H04W 4/70 |
| 2017/0325059 A1* | 11/2017 | de la Broise | H04W 4/02 |
| 2017/0332196 A1* | 11/2017 | Farley | H04W 64/00 |
| 2017/0336383 A1* | 11/2017 | Troxler | A01K 15/023 |
| 2017/0344939 A1* | 11/2017 | Linton | G01S 5/0294 |
| 2017/0352250 A1* | 12/2017 | de Barros Chapiewski | H04W 4/029 |
| 2017/0352251 A1* | 12/2017 | de Barros Chapiewski | H04W 4/029 |
| 2017/0352252 A1* | 12/2017 | de Barros Chapiewski | H04W 4/029 |
| 2017/0352253 A1* | 12/2017 | de Barros Chapiewski | H04W 4/029 |
| 2017/0352254 A1* | 12/2017 | de Barros Chapiewski | H04W 4/029 |
| 2017/0353829 A1* | 12/2017 | Kumar | H04W 4/029 |
| 2017/0353833 A1* | 12/2017 | de Barros Chapiewski | H04W 4/029 |
| 2018/0014150 A1* | 1/2018 | Elias | H04L 63/0861 |
| 2018/0018618 A1* | 1/2018 | Groseclose | G06Q 10/08 |
| 2018/0041944 A1* | 2/2018 | Korneluk | H04W 4/02 |
| 2018/0041965 A1* | 2/2018 | Korneluk | G01S 5/0294 |
| 2018/0046979 A1* | 2/2018 | Siminoff | G01S 19/24 |
| 2018/0046980 A1* | 2/2018 | Siminoff | G01S 19/24 |
| 2018/0088098 A1* | 3/2018 | Mandava | G06Q 10/0833 |
| 2018/0276427 A1* | 9/2018 | Depew | H04L 67/306 |

(56) References Cited

U.S. PATENT DOCUMENTS

2018/0301009 A1* 10/2018 Mains ............... G08B 13/2434
2019/0059050 A1* 2/2019 Fuleshwar Prasad .. H04W 4/70

OTHER PUBLICATIONS

Asset-Tracking Technology Helps iGPS Rescue Its Pallets. RFiD Journal. Mar. 5, 2012. 2 pages. Retrieved from the Internet: <URL: http://www.rfidjournal.com/articles/view?9284>.
International Patent Application PCT/2019/015643 International Search Report dated May 20, 2019. 7 pages.
International Patent Application PCT/2019/015643 Written Opinion dated May 20, 2019. 9 pages.

* cited by examiner

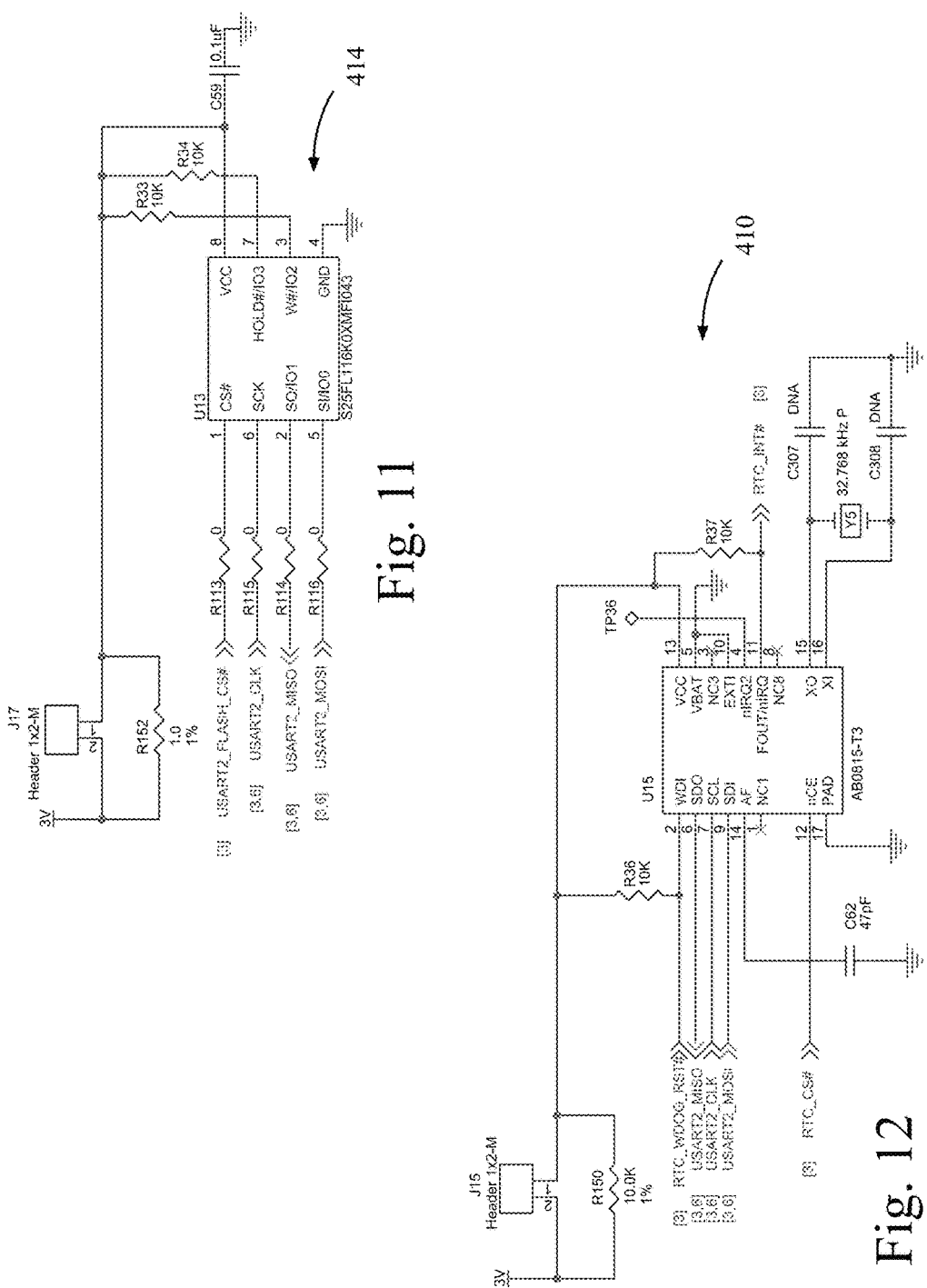

ASSET TRACKING SYSTEM

BACKGROUND

In the world of logistics, there is a desire to track the location of shipments, assets within shipments, equipment, storage containers, and the like. For example, there has been a relatively recent upsurge in consumer demand for tracking their purchases or packages, and more significantly, commercial entities have a strong need for asset tracking along their entire supply chain. Systems have been proposed to track the location of assets, but as of yet, none have achieved significant commercial market penetration.

Thus, there is a need for improvement in this field.

SUMMARY

A system and method of tracking has been developed for various types of storage/transport structures or platforms, such as pallets and/or storage containers, along with their contents. During development of this system, it was discovered that power consumption was a significant barrier to commercializing the system. The tracking system needed to be portable so that it could be moved with the tracked asset, and as such, the power supply for the tracking system needed to be portable. Due to its portable nature, the power supplies, such as batteries, have limited energy storage capacity. Since most current pallets and other storage containers require very little upkeep, it was further learned that power from the power supply needed to last for the entire life cycle of the pallet and/or container in order to avoid the need for replacement. Earlier designs were found to solely use Global Positioning Systems (GPS) for location tracking which has been assumed to drain power rather quickly. In warehouses, manufacturing plants, or other structures, the GPS signals may not be available and/or not accurate enough to provide the requisite precision for tracking within the structure. Moreover, communication by the tracking systems, such as over cellular networks, was discovered to be another significant power drain. Cellular networks can also have dead spots within structures or even outside in remote locations such that communication is inhibited. It was also realized that environmental conditions, such as temperature or even impacts, can negatively affect available power from the power supply and/or the life of the power supply. Cold temperatures for instance can detrimentally limit the power supplied from batteries. For certain items that can be detrimentally impacted by the environment, such as perishables and/or fragile items (e.g., wine, food, electronics, etc.), the act of monitoring and reporting conditions can unduly drain the power supply. The system and technique described and illustrated herein is configured to locate, track, and/or monitor environmental conditions of assets in a precise and energy efficient manner. The system uses techniques for conserving power that allow the power supply, like a battery, to last for the entire commercial life of a transport structure, such as a pallet or container. In one example, a pallet includes a tracking device that includes a location detection system for detecting the location of the pallet and a communication system for communicating the location of the pallet to a hosted or cloud based tracking system. The tracking system in this example uses techniques that allow the battery or other power supply to at least last for the entire commercial life of a pallet which, under normal conditions, is about two years.

Depending on a number of factors, the location detection system is able to switch between (or combine) several location detection techniques. For instance, when the pallet is travelling on a truck, the location detection system may detect its location using GPS, assisted GPS (aGPS), dead reckoning, via accelerometer sensors, and/or other location detection techniques. Once inside a warehouse, the location detection system may switch to a different technique, such as using a Wi-Fi-based positioning system (WPS), BLUETOOTH®-based positioning system, and/or incorporate other combinations of location detection techniques. For instance, the location detection system may switch from GPS to WPS when the pallet is placed indoors so as to improve location accuracy and/or conserve energy. Similarly, the communication system is able to switch between various communication techniques, such as between cellular, Wireless Personal Area Network (WPAN) (e.g., BLUETOOTH®), and/or Wi-Fi networks. Among other things, this ability to switch between communication systems allows the tracking system to conserve energy as well as improve communication. The pallet can include one or more alarms, such as visual or auditory alarms, that alert an individual to its location.

Considering most traditional pallets require little maintenance or upkeep, the tracking device is designed to include a power source that requires little operator interaction and maintenance. In one form, the tracking device includes an ambient energy harvesting and/or long-lived battery coupled with low-power electronics and firmware routines. By way of nonlimiting examples, the power sources can include a battery and/or a capacitor as well as power sources for harvesting energy from ambient vibrations, such as through linear induction and/or piezoelectric materials, and/or ambient conditions, such as solar cells. The pallet or container can further include one or more sensors for detecting the amount and/or presence of the contents of the pallet. In one example, piezoelectric materials not only generate power when content is added and/or removed from the pallet (or as a result of pallet movement) but also are used to sense the amount of contents on the pallet and/or whether the pallet is empty. In another example, the tracking system assumes a pallet is empty after a certain time from reaching a specific location or destination. Once the system recognizes a pallet is empty, it can be displayed to the user as such and may be used for another tracked delivery.

To facilitate the low-power nature of the tracking device, most of the required processing is offloaded to a cloud-based application. At prescribed time intervals the tracking device transmits its location and/or raw data for determining its location to the cloud-based application package. The cloud-based application is responsible for combining that information with inventory management data from a user's warehouse management system (WMS). End users are able to log into the cloud-based application via a graphical user interface (GUI) on a PC, tablet, smartphone, etc. to view their traveling inventory at-a-glance or look at real-time positioning of a pallet on a map. A user is also able to set up an automated alert triggering an email or text message to interested parties if the pallet does not reach the destination in a specified time, or if it traveled outside of its intended route. A number of different alarms can be configured including, but not limited to, location-based, time-based, off-route, and unauthorized movement alarms. A worker on a warehouse floor who needs to find a pallet can log into the system with a smartphone or tablet, view the estimated location of the pallet in question, and transmit a command to the pallet to trigger a visible or audible cue as additional guidance to its location on the floor or in a rack.

In one example, the pallet tracking device will be at least first incorporated in a composite pallet product. For two-way communication purposes, the system includes a cell phone transceiver and a WPAN (e.g., BLUETOOTH®) transceiver. The system has the ability to geo-locate using a GPS device, cell phone triangulation, and/or WPAN (e.g., BLUETOOTH®) triangulation. In addition, the sensor package includes a temperature sensor and an impact sensor in the form of an accelerometer. The pallet tracking device or package is configured to use minimal power as its power is supplied by an alkaline battery.

In the system, the particular pallet is identified by the cell phone transceiver's International Mobile Equipment Identity (IMEI) number. Periodically, the device via the cell phone (and/or BLUETOOTH®) transceiver sends information including its IMEI number, voltage information, configuration information, and information related to the location, time, temperature and accelerometer information along with a timestamp and next expected report time. All or some of this information can be cached between reporting intervals. To conserve power, the location determination and other functions are remotely performed using a cloud-based service such as Amazon's AWS®. The cloud-based service has an application program interface (API) that allows other systems such as Enterprise Resource Planning (ERP) systems to interface and track the various pallets.

When the pallet is located outside of the warehouse, the device measures the position using GPS tracking periodically, such as every few minutes or hours, but this interval can vary in other examples. If an accurate location is unable to be determined through GPS, then cell phone triangulation can be used to generally locate the pallet, either alone or in conjunction with the available GPS signal. A unique error compensation method is used to determine whether a pallet is stationary or not. When GPS is used, a 400 meter radius is used to determine whether the pallet has moved so as to compensate for potential measurement errors. When cell phone tracking is used, a 2 mile radius or geo-fence is used. Of course these radii can vary depending on the situation. In another variation, the tracking system can determine whether it is inside or outside based on the temperature sensor for which detection method to use.

When indoors, the system uses a WPAN (e.g., BLUETOOTH®) beacon technique to track the location of the pallet within the warehouse. To improve the location determination within the warehouse, the system uses a unique beacon location technique that determines the top three overall BLUETOOTH® beacons in terms of average signal strength and determines its location based on the top three beacons. In another example, more or less numbers of beacons can be used for location determination.

Since cell phone communication uses the greatest amount of power, the device uses a unique reporting technique to help conserve power of the battery. In particular, it uses an inverse power function reporting technique that generally increases the delay between location reports and other information the longer the pallet remains generally stationary. This technique can allow the alkaline battery used in the device to last up to two years which is typically the normal operational life of a pallet. For example, when the pallet is moving, the pallet tracking device wakes up and reports back on its location with a one-hour time interval. However, when the pallet is measured as being stationary, the reporting interval in which it wakes up and reports is increased the longer the pallet remains stationary. For example when it is detected to be stationary, the reporting interval can be doubled each time up to a 24-hour interval. Upon detection of movement, the tracking device returns to its normal reporting interval of one hour. Of course, other reporting interval lengths can be used in other examples.

Since some batteries are unable to supply sufficient power when cold, the tracking device uses a best effort algorithm for reporting before the tracking device dies due to a lack of sufficient power. For example, when the temperature outdoors falls below 25° F., the system will generate a report of all the information and not necessarily transfer it via cell phone but rather store it in memory. Once the temperature rises or power is restored, it can then report in the normal periodic manner. The data is saved until the next wake up and report interval.

The tracking device uses an LTE Cat1 chipset with one megabyte of memory, and for cost purposes the accelerometer has a limited range in which to detect acceleration. For example, the accelerometer may be only able to detect at most 16 g acceleration, but most drops experience 100's of g's. In light of the limitations of the accelerometer, a new technique for detecting drops has been developed that compensates for this limited acceleration detection range under low-power conditions. The acceleration is measured over specified intervals and an average is taken on the acceleration change. If the acceleration change exceeds a limit over a number of specified intervals (e. g., 3 intervals), the system determines that the pallet has been dropped. As a configurable feature, in some embodiments, instead of immediately reporting the drop, the system saves the information and returns to sleep mode for reporting later at the specified reporting interval. Once it wakes up, the system reports the drop along with the geographic location.

In still yet another aspect, the system through the cloud-based API is able to turn on/off certain features of the pallet tracker device. For example, the API can be used turn off drop detection under certain conditions as well as place the tracking device in airplane mode for an individual or multiple pallets. In addition, alerts can be set when certain conditions are satisfied.

Further forms, objects, features, aspects, benefits, advantages, and embodiments of the present invention will become apparent from a detailed description and drawings provided herewith.

BRIEF DESCRIPTION OF THE DRAWINGS

FIG. 11 is a schematic diagram of a memory for the tracking device of FIG. 5.

FIG. 12 is a schematic diagram of a real time clock for the tracking device of FIG. 5.

DESCRIPTION OF THE SELECTED EMBODIMENTS

Figure 1:
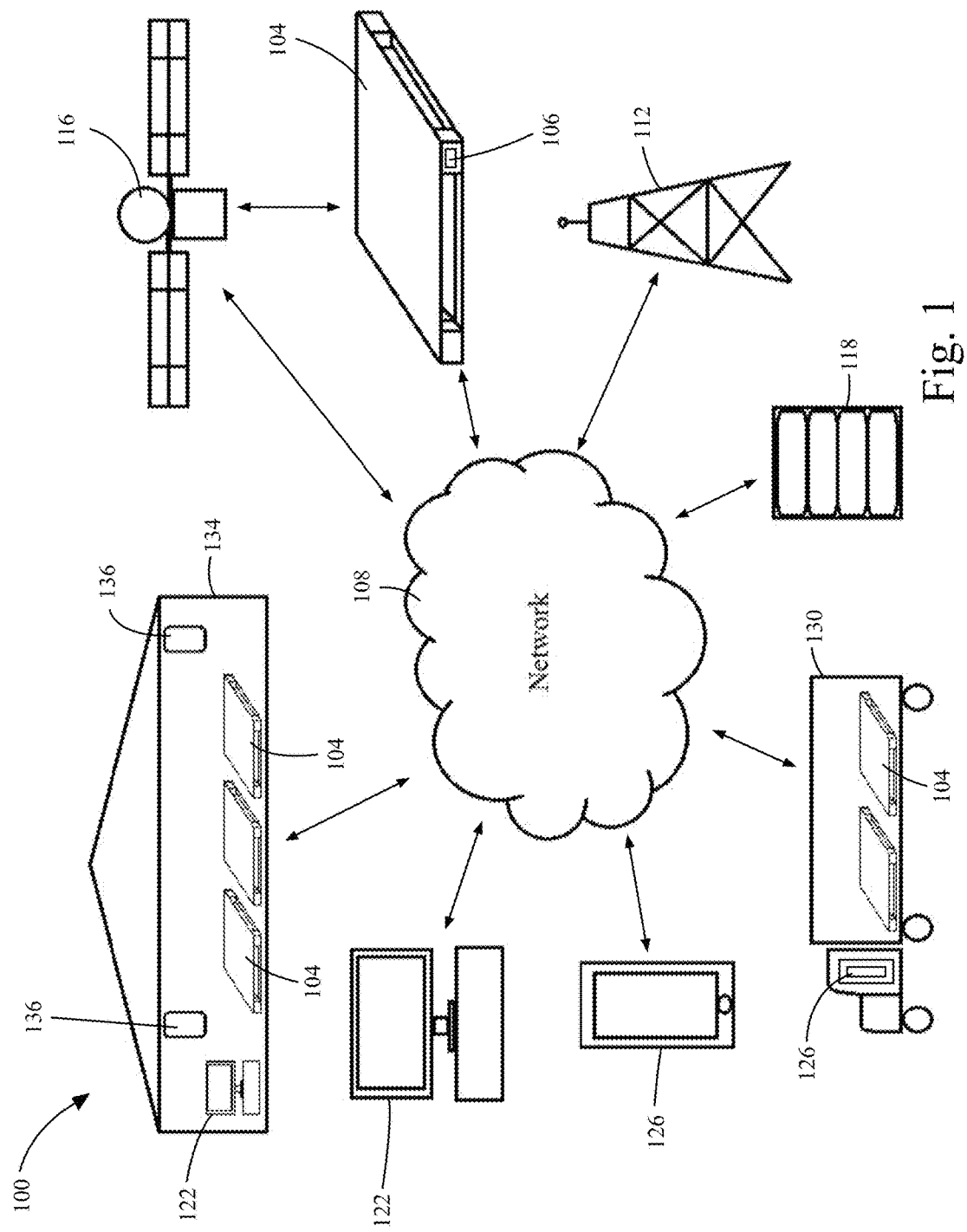
FIG. 1 is a schematic diagram of an inventory tracking system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 illustrates a schematic diagram of an inventory tracking system 100 for tracking various types of storage/transport structures and/or platforms, such as pallets and/or storage containers, along with their contents. A transport structure 104 includes a tracking device 106 that connects the transport structure to a network 108, visualized as the internet in FIG. 1. The transport structure 104 may be any type of assembly and/or device that is able to move goods, items, and/or other objects; however, for ease of reference, the transport structure 104 will be referred to as a pallet 104. As an example, the tracking device 106 is placed on a single pallet 104 and providing tracking data for just the pallet 104. In other embodiments, the tracking device 106 is positioned to provide data for multiple cases of goods, such as an entire truckload of pallets 104 either positioned within the truck or on a single pallet 104 that will remain in a close vicinity to the other pallets 104 in the truck.

The tracking device 106 is capable of providing location details for the pallet 104 using several different methods and is capable of switching between location detection techniques based on signal availability and/or power consumption. As one example, location details for the pallet 104 can be provided by using a mobile communication network, for instance, by triangulation using land-based cellular antennae 112. Alternatively or additionally, the tracking device 106 is also able to receive signals from a satellite 116 to provide location data, for example using a global navigation satellite system (GNSS), such as GPS, to provide location data. Data from the tracking device is then transmitted to the network 108 using a cellular antenna 112 and/or a satellite 116.

Tracking information and other information regarding the transport structure 104 is transmitted over the network 108 to one or more servers having cloud-based application 118. The server with the cloud-based application 118 in one form includes a database for, among other things, storing location information and/or other data concerning the pallets 104. The server with the cloud-based application 118 can include any of a variety of cloud-based applications including, but not limited to, Amazon Web Services® (AWS) and/or Google® Cloud Platform. As an example, a cloud-based application may be a program that accepts location data as an input from a device such as a tracking device. Some or all processing of the location data to determine the location of the tracking device 106 is performed by the cloud-based application 118 on a remote server, reducing the processing required to be performed by the tracking device 106 and therefore saving power and increasing battery life. The cloud-based application 118 also combines the tracking information with other user data and databases. A user then accesses the cloud-based application 118 to view the location of the tracking device 106, as well as any other characteristics measured by the tracking device 106 and transmitted over the network 108 to the cloud-based application 118.

Computing devices such as a computer 122 and/or a mobile device 126 connect to the network 108 to allow a user access to the information collected and transmitted to the cloud-based application 118 by tracking device 106. A user logs in to the cloud-based application 118, for example, using a graphical user interface (GUI), to view inventory location information and/or to review other characteristics of the transport structure that are collected and transmitted by the tracking device 106.

In one example, pallets 104 are loaded on a vehicle 130, such as a truck, for delivery. The vehicle 130 connects to the network 108 using tracking devices 106 on the pallets 104. Alternatively or additionally, a mobile device 126 (e.g., a cellphone) and/or a computer 122 is present within the vehicle 130 to allow the vehicle operator to connect to the network 108 and monitor the condition of the pallets 104 as well as monitor the inventory loaded in the truck.

Likewise, in another example, pallets 104 are stored in a storage facility 134 or other similar structure. Short-range communication beacons 136 within the storage facility 134 are used to determine a location of a certain pallet 104 within the storage facility 134. Short-range communication methods such as BLUETOOTH Low Energy (BLE) and/or a Wi-Fi based positioning system (WPS) may provide more accurate location data when the pallet 104 is indoors and may also conserve more energy than a satellite navigation and/or mobile communication location technique. The location information determined from the short-range communication beacons 136 is transmitted to and stored on the network 108, so a user can determine the location of a given pallet 104. A computer 122 and/or a mobile device 126 in one example is included in the storage facility 134, allowing a user to access the network 108 to view location information and/or condition information for different pallets 104.

Figure 2:
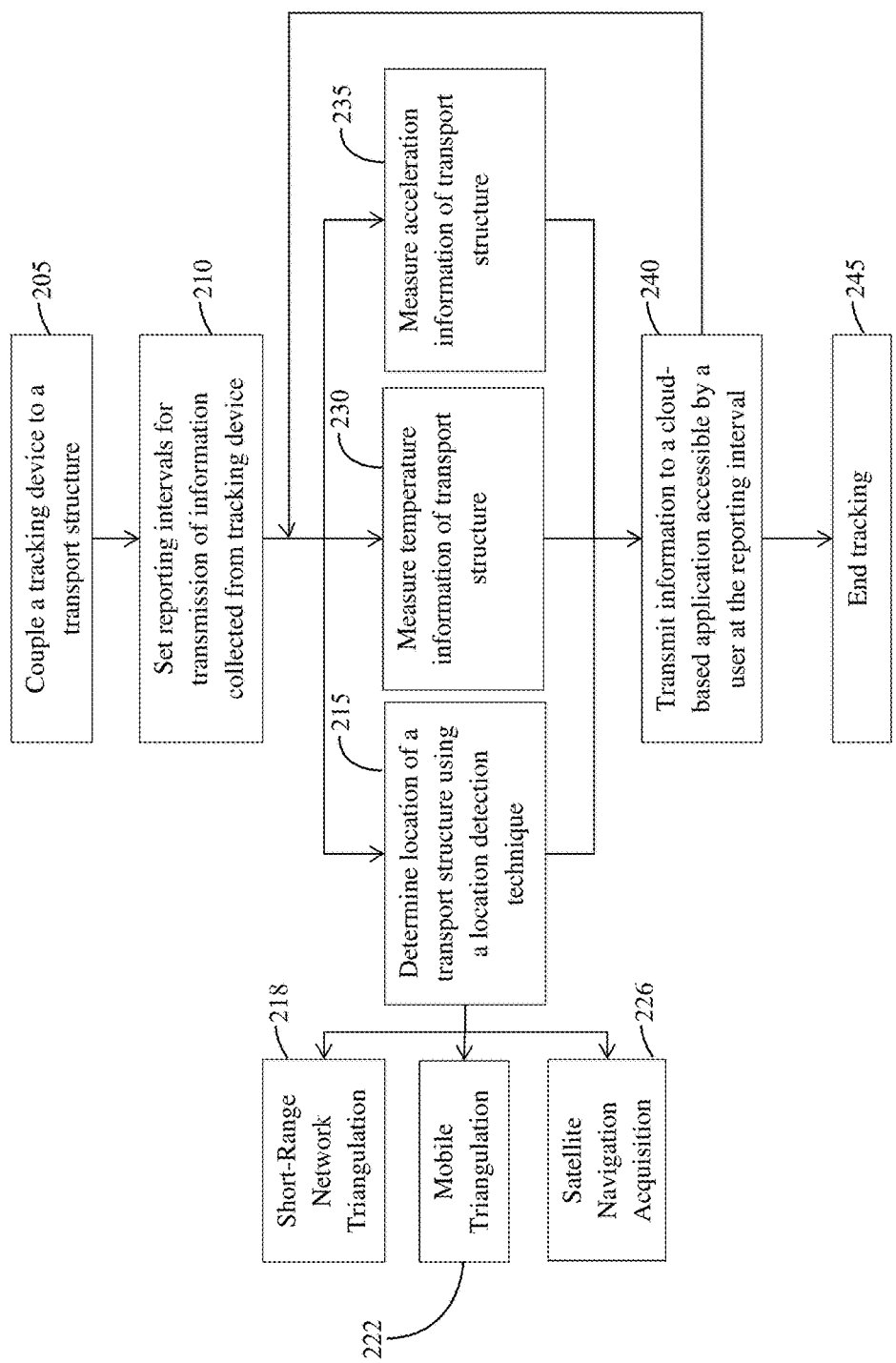
FIG. 2 is a flow chart illustrating a process of tracking inventory using the inventory tracking system of FIG. 1.

A flow chart 200 illustrating the process of tracking inventory using the inventory tracking system 100 is shown in FIG. 2. In stage 205, the tracking device 106 is coupled to a transport structure, such as a pallet 104. The tracking device 106 in one example is attached and/or embedded in the pallet 104 during initial manufacturing of the pallet 104, and in other examples, the tracking device 106 is attached as an aftermarket product after the pallet 104 is manufactured. The tracking device 106 is programmed to set certain reporting intervals for transmitting information collected by the tracking device 106 in stage 210. As an example, the reporting intervals are set so that data is transmitted from the tracking device 106 every hour. In other embodiments, other intervals are used, such as every 4 hours or every 24 hours. It is not required that the reporting intervals be uniform, so that the time between transmissions may be varied. In one embodiment, when the tracking device 106 is moving, the tracking device 106 transmits information every hour, and once the tracking device 106 is stationary, the tracking device 106 backs off the reporting interval. For instance, so long as the tracking device 106 remains stationary, the tracking device 106 progressively increases the reporting interval to every 2 hours, 4 hours, 8 hours, 12 hours, and then 24 hours. In one variation, the 24 hour reporting interval is the maximum reporting interval when the tracking device 106 is stationary, but other maximum intervals can be used. As mentioned before, the tracking device 106 in one form uses an inverse reporting interval technique in which the time intervals between reporting information doubles while the pallet 104 remains generally stationary and/or at one general location.

Once the reporting intervals are set and the tracking device 106 is activated, the tracking device 106 begins recording data. It is possible to use the tracking device 106 to track several different characteristics of the pallet 104. For example, in stage 215, the tracking device 106 determines the location of the pallet using one of several different location detection techniques. When the pallet is located indoors, the tracking device 106 uses triangulation of a short-range communication network 218, such as WPAN (e.g., BLUETOOTH®) triangulation and/or a Wi-Fi based positioning system (WPS) to determine location. In other instances, the tracking device 106 uses other geo-location techniques such as mobile phone triangulation 222 and/or a satellite navigation acquisition method 226, such as GPS, to determine the location of the pallet 104.

In addition to providing location information, in stage 230, the tracking device 106 measures the temperature for the transport structure. For example, pallet 104 can be used to transport material that is temperature sensitive, such as food or wine, and constantly measure the temperature of the environment in which the pallet 104 is transported. In stage 235, the tracking device 106 also includes an accelerometer to measure acceleration information for the pallet 104. The accelerometer may provide information as to when the pallet 104 has been moved and/or when the pallet 104 has been dropped.

In stage 240, information recorded by the tracking device 106 is transmitted to a cloud-based application 118 for processing. The information is collected by the web service and processed to be accessible by the user. The user is able to access this information to check on the status of their delivery, to determine an estimated ship time, to monitor temperature conditions, and/or to view any other details measured by the tracking device 106.

The schedule for transmission of data from the tracking device 106 to the cloud-based application 118 is determined by the reporting intervals that were set in stage 210. The tracking device 106 continues to determine location information and measure temperature and acceleration information at the programmed intervals as long as tracking is active. Tracking is performed as the pallet 104 is in transit, but also may continue while the pallet is stationary, for example, while it is stored in a storage facility. When a user no longer desires to monitor the pallet 104, the tracking device 106 is deactivated, and tracking is ended in stage 245.

Figure 3:
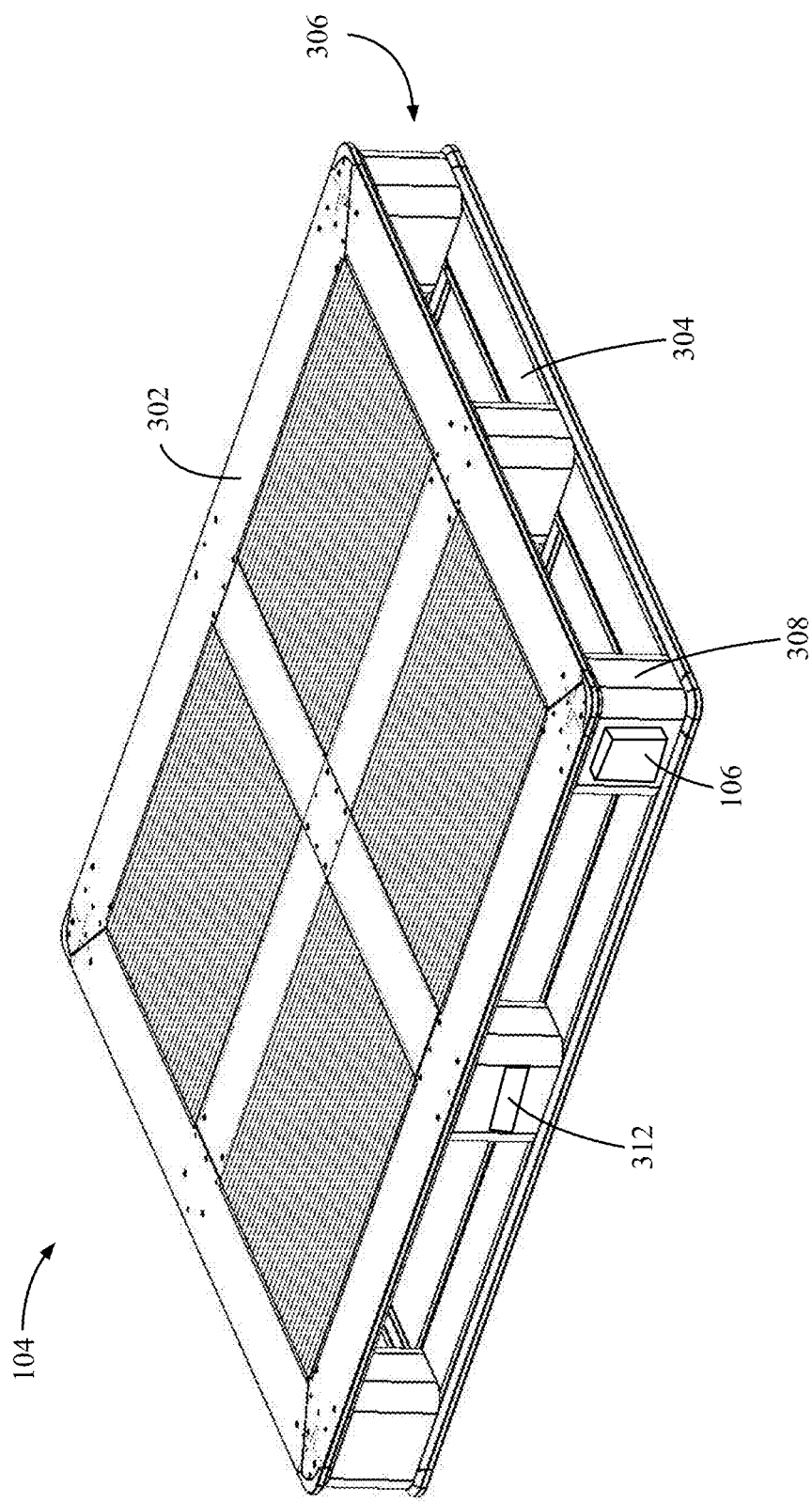
FIG. 3 is a perspective view of a pallet with a tracking device from the inventory tracking system of FIG. 1.

FIG. 3 shows an example of a pallet 104. The pallet 104 includes a top deck 302, a bottom deck 304 and a spacer structure 306 disposed between the top deck 302 and the bottom deck 304. The spacer structure 306 is composed of one or more blocks or supports 308 that are positioned between the top deck 302 and the bottom deck 304. A tracking device 106 is attached to one of the supports 308. As shown in FIG. 3, the tracking device 106 is attached to an outside of the support 308, but in other embodiments, the tracking device 106 is attached to other surfaces of the support 308. In other embodiments, the tracking device 106 is attached to a different support 308, for example, the tracking device 106 is attached to a support 308 in the middle of the pallet 104 or to a support 308 at an opposite end of pallet 104. Alternatively or additionally, the tracking device is attached at a different position on the pallet 104 such as on the top deck 302 or on the bottom deck 304. In some embodiments, the pallet 104 is a hollow structure, and the tracking device 106 is implanted or otherwise embedded within the pallet 104.

In some embodiments, the pallet 104 includes additional features for creating energy from ambient sources to supplement the power source of the tracking device 106 and prolong the life of the tracking device 106. In one example, the pallet 104 includes a piezoelectric generator 312 to create energy from ambient vibrations. In other examples, additional features that create energy from ambient sources, such as solar cells, are also included on the pallet 104 either in combination with the piezoelectric generator 312 or without the piezoelectric generator 312. The piezoelectric generator 312 can also be used to measure and detect contents stored on the pallet 104. The piezoelectric generator 312 acts as a content level sensor to determine when contents have been added to the pallet 104 and/or when contents have been removed from the pallet 104. The piezoelectric generator 312 can also be used to determine when the pallet 104 is empty and can be used to signal to turn off the tracking device to save power until the pallet 104 is put into use again.

Figure 4:
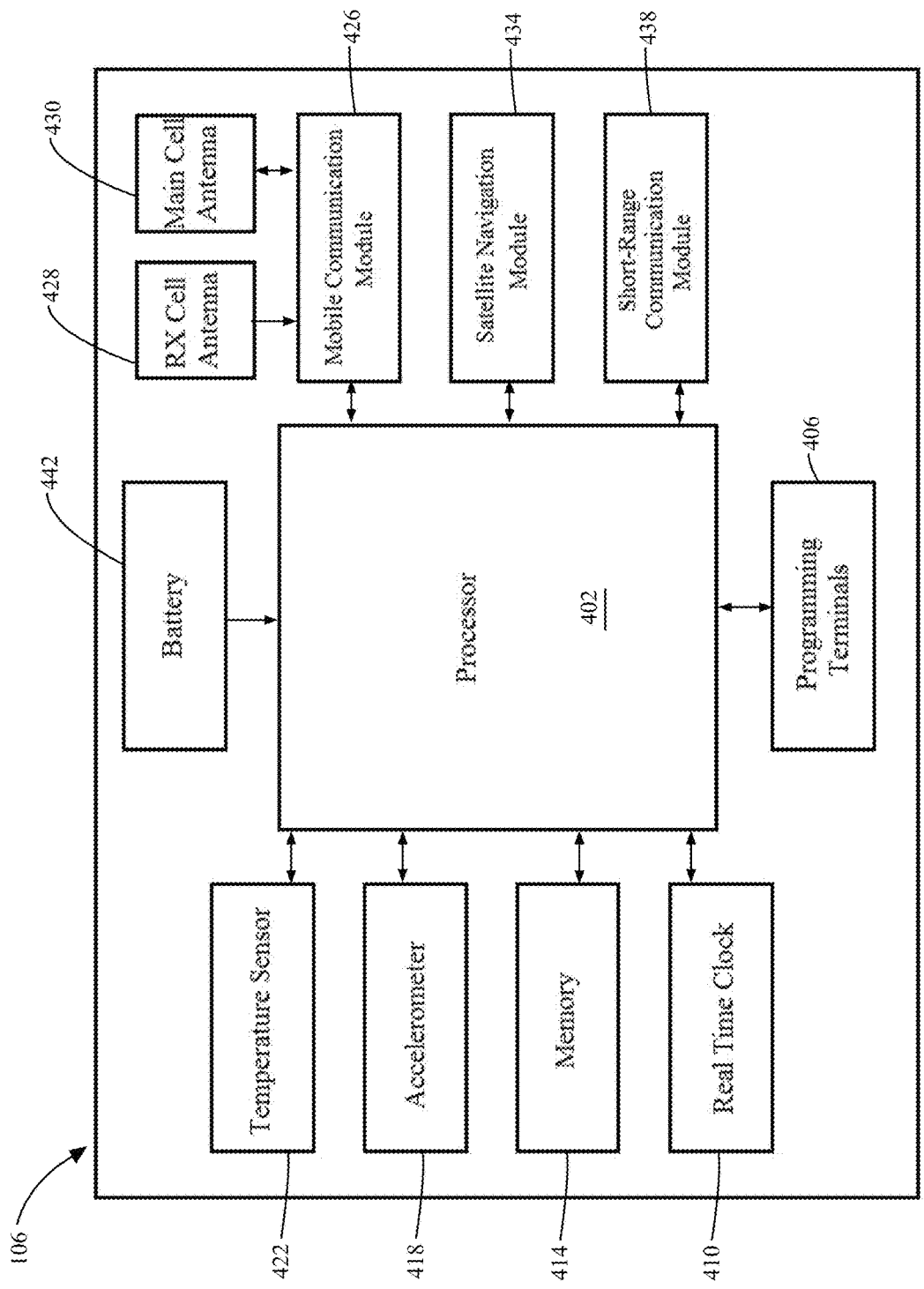
FIG. 4 is a schematic diagram of an embodiment of a tracking device for the inventory tracking system of FIG. 1.

A schematic diagram of the tracking device 106 is shown in FIG. 4. The tracking device 106 includes a processor 402 that is in communication with programming terminals 406 that allow input and output for providing instructions to the processor 402. The processor 402 is also electrically connected to a real time clock 410 that provides date and time information. Memory 414, such as SPI flash memory, is provided for data storage.

An accelerometer 418 is used to measure acceleration of the pallet 104. An example of a suitable accelerometer 418 is a BMA280 produced by Bosch® Sensortec of Kusterdingen, Germany. A temperature sensor 422 measures temperature data. In addition to the accelerometer 418 and the temperature sensor 422, several different components for determining location are connected to the processor 402. A mobile communication module 426 includes a modem and is electrically connected to a receiver (RX) cell antenna 428 and a main cell antenna 430, allowing the tracking device 106 to send and receive data via cellular communication towers. A location is determined using triangulation between the tracking device 106 and the cellular towers. A satellite navigation module 434 allows communication with a satellite navigation system such as GPS and/or Galileo. A short-range communication module 438 allows wireless communication via short-range radio technology such as WPAN (e.g., BLUETOOTH®) beacons and/or Wi-Fi beacons. Triangulation between the tracking device 106 and the short-range communication beacons may be used to determine the location of the tracking device 106. The tracking device 106 also includes a power supply 442, which in the illustrated example is in the form of a battery, for powering the processor 402 and other components in the tracking device 106. In one form the battery 442 includes a 6-volt alkaline battery. Alternatively or additionally, other types of power sources 442 can be used, such as super capacitors.

Figure 5:
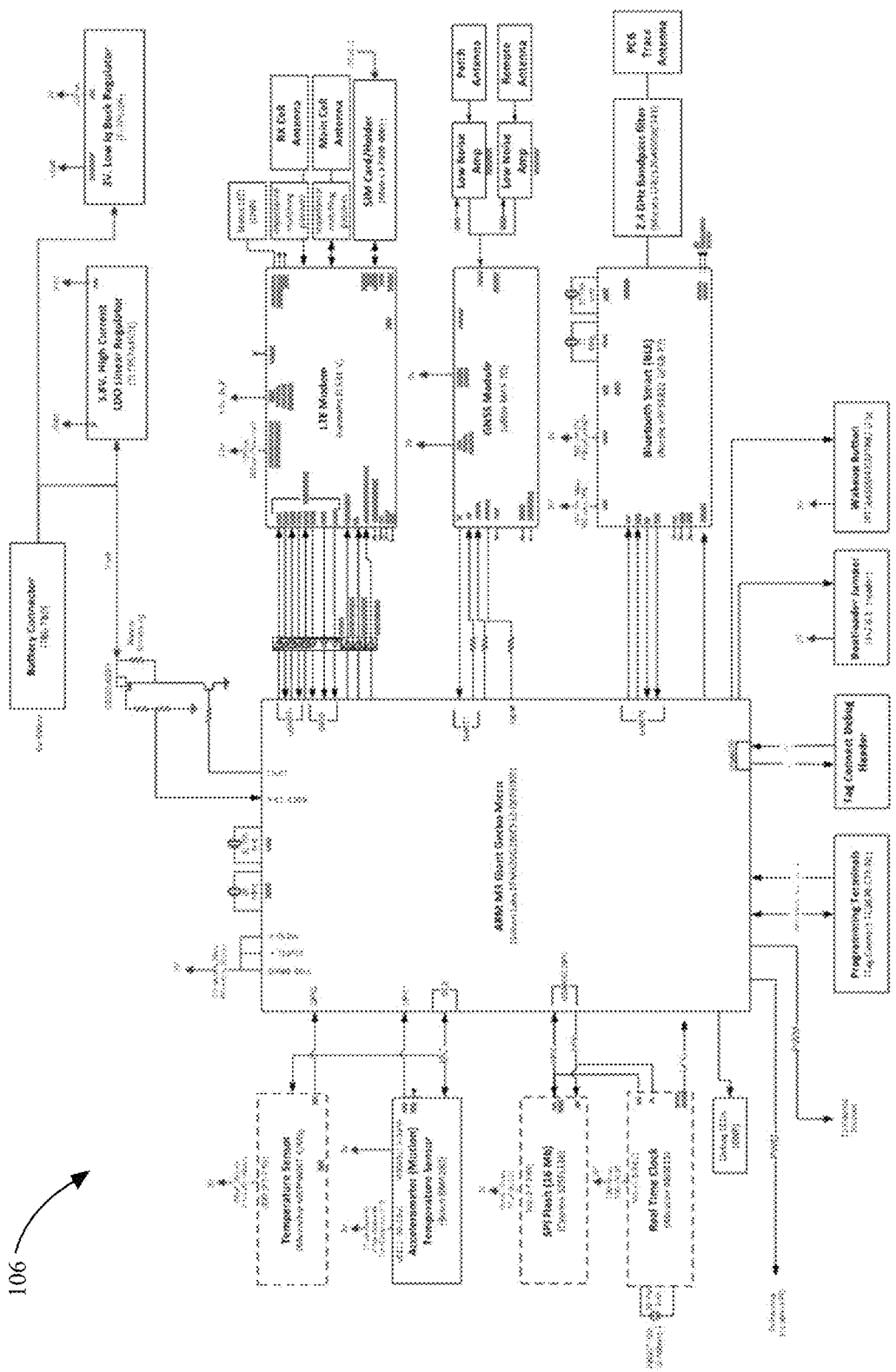
FIG. 5 is a schematic diagram of an embodiment of a tracking device for the inventory tracking system of FIG. 1.
Figure 6:
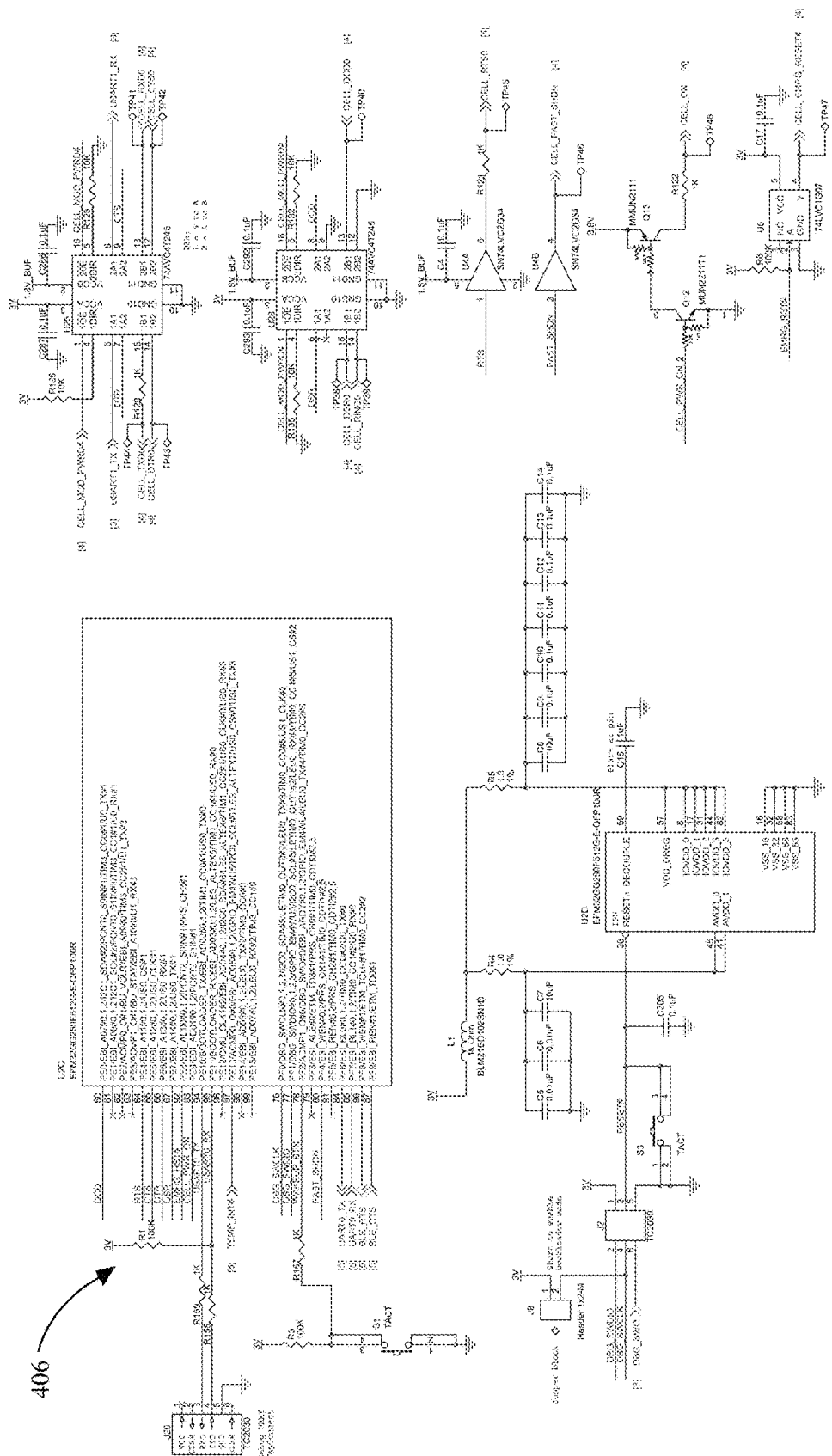
FIG. 6 is a schematic diagram of a processor for the tracking device of FIG. 5.
Figure 7:
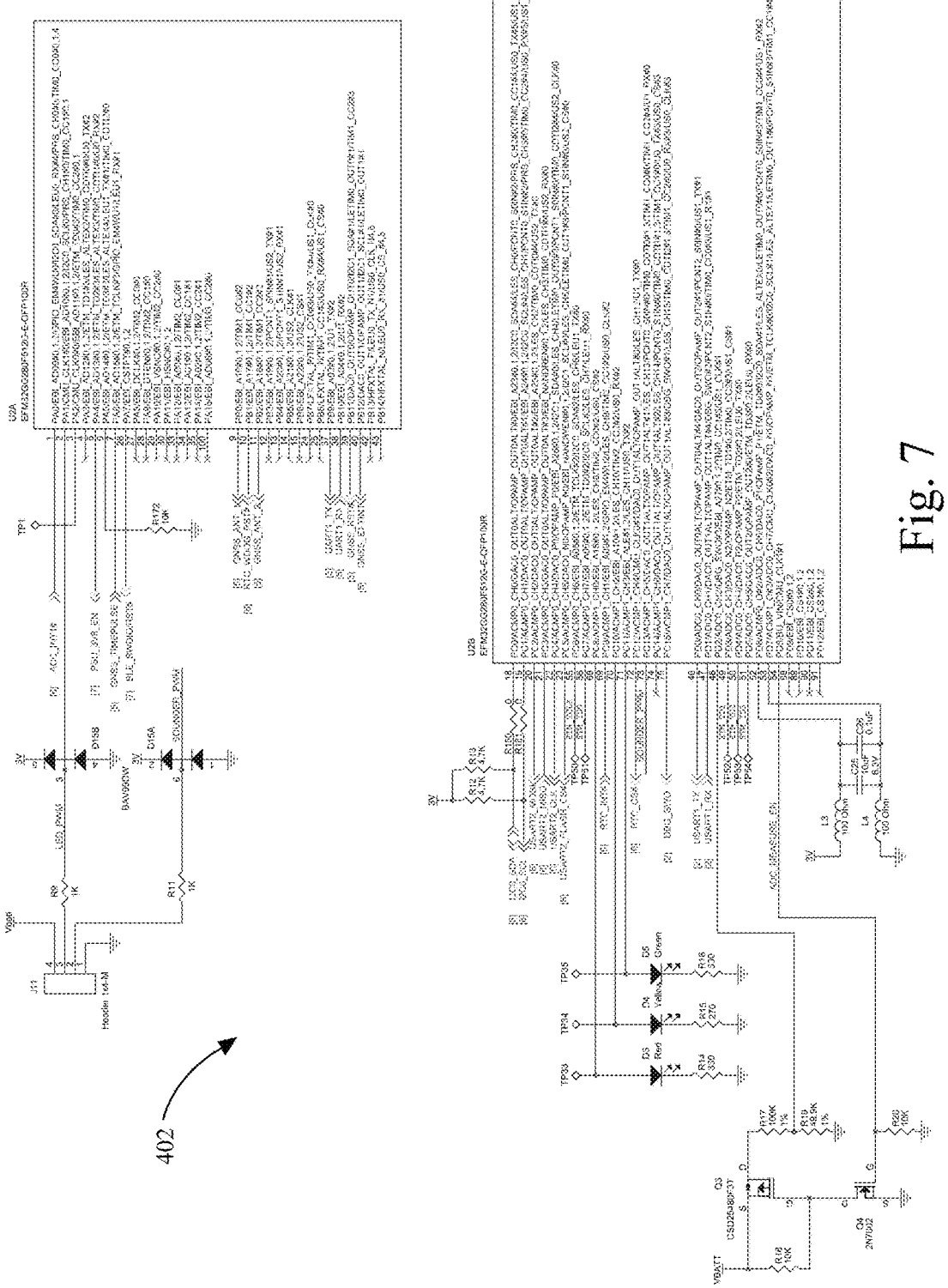
FIG. 7 is a schematic diagram of the processor of FIG. 6.
Figure 8:
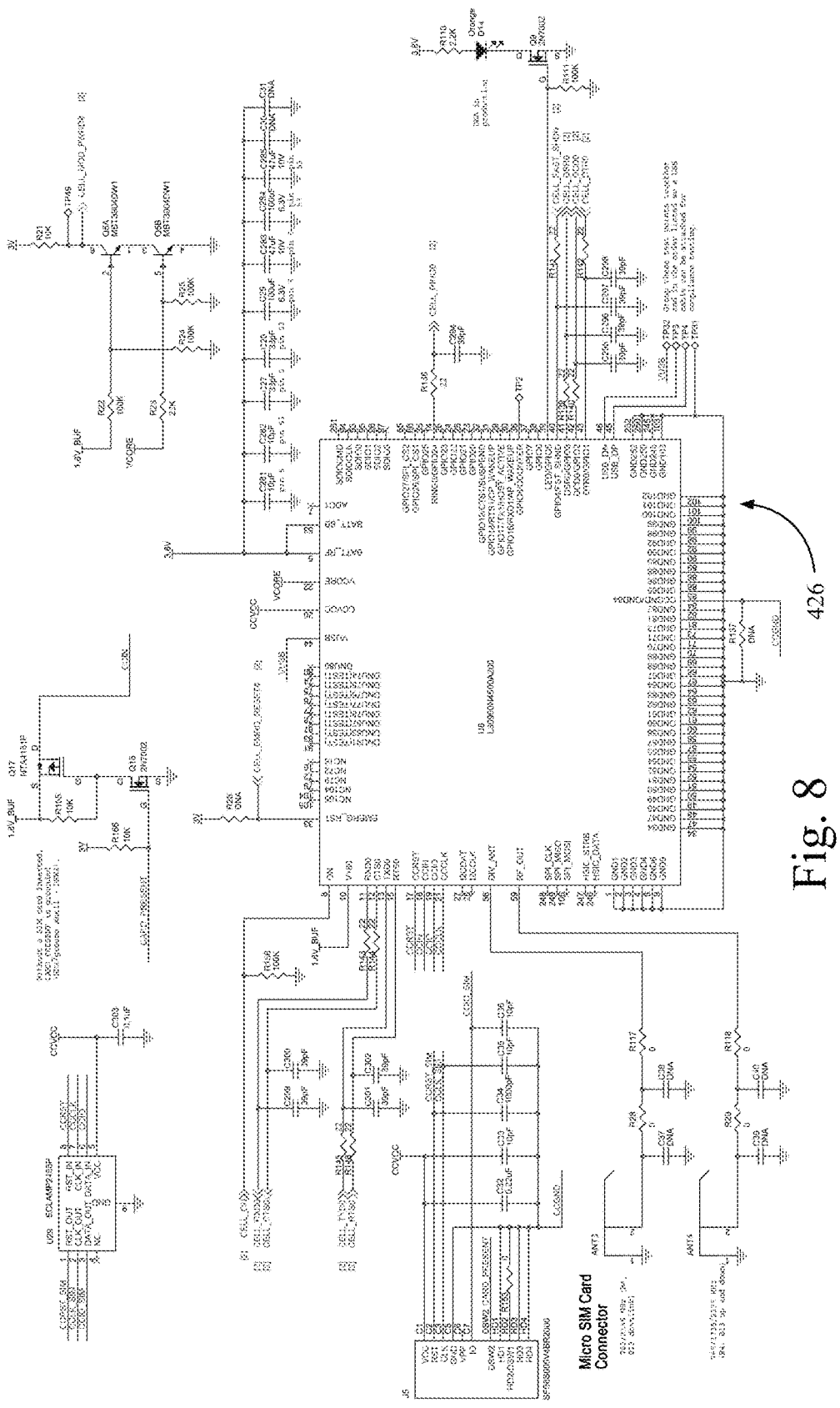
FIG. 8 is a schematic diagram of a modem for the tracking device of FIG. 5.
Figure 9:
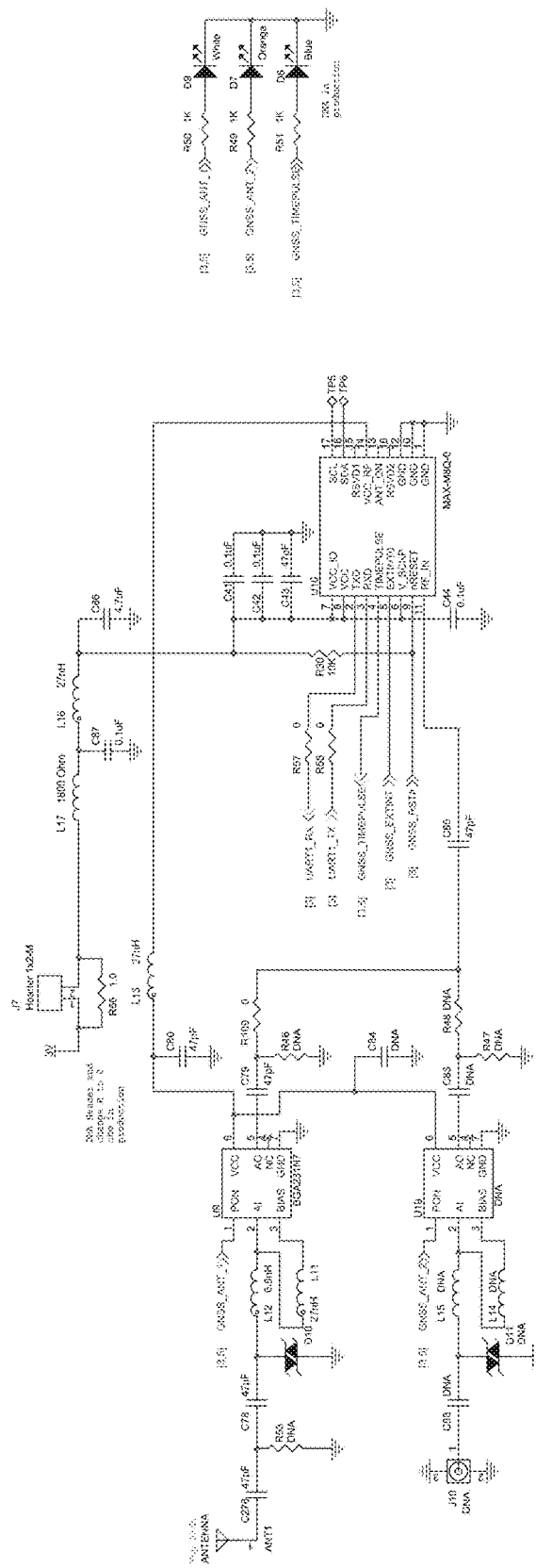
FIG. 9 is a schematic diagram of a satellite navigation module for the tracking device of FIG. 5.
Figure 10:
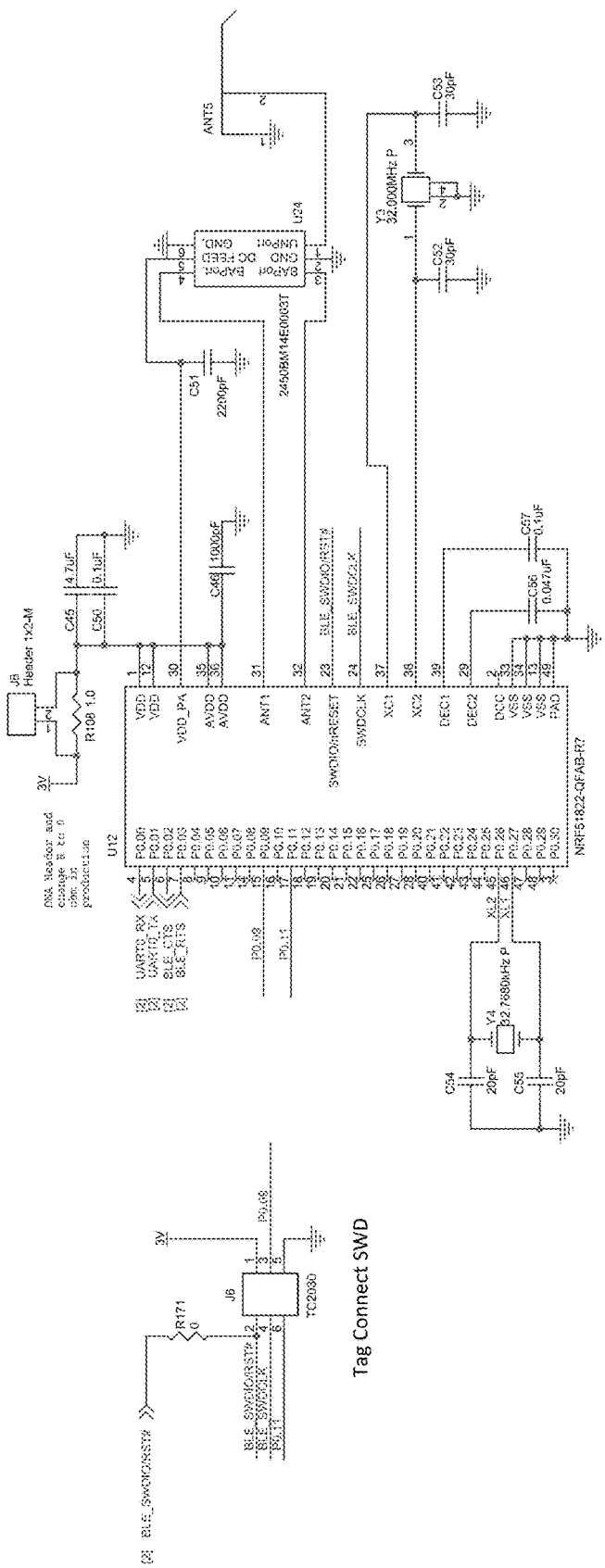
FIG. 10 is a schematic diagram of a short-range communication module for the tracking device of FIG. 5.
Figure 13:
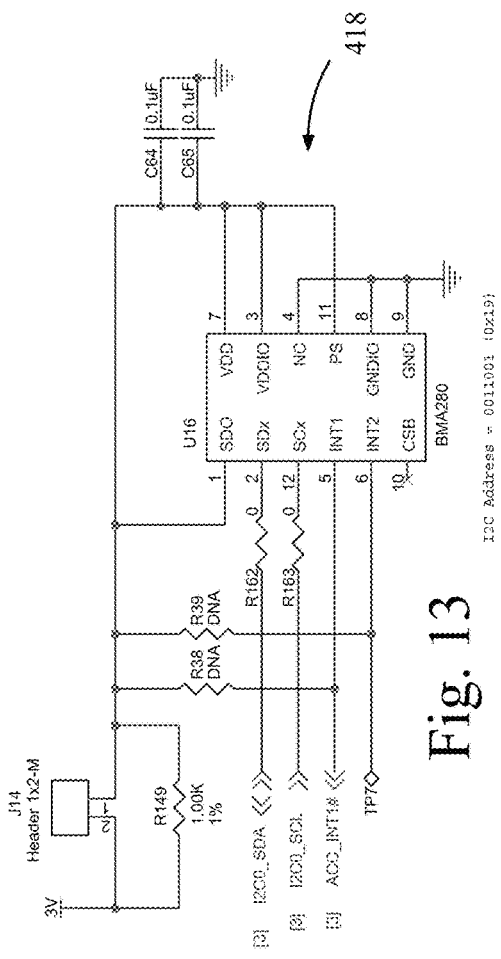
FIG. 13 is a schematic diagram of a accelerometer for the tracking device of FIG. 5.
Figure 14:
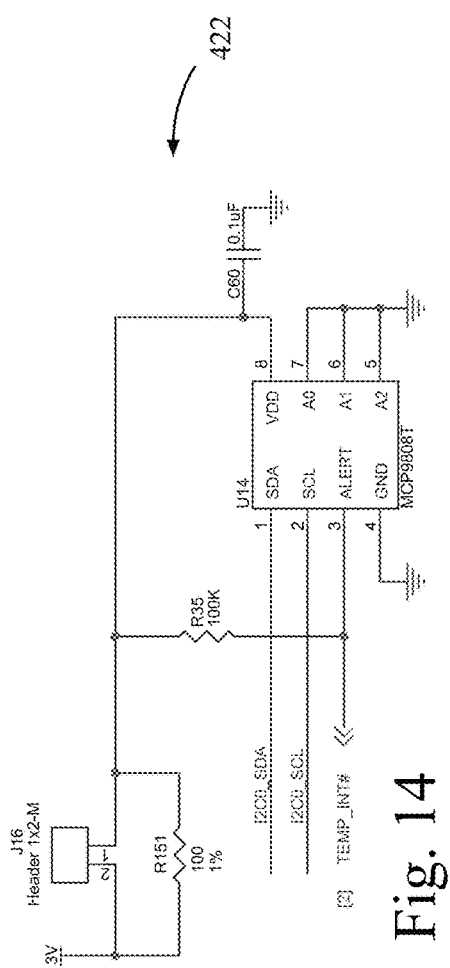
FIG. 14 is a schematic diagram of a temperature sensor for the tracking device of FIG. 5.
Figure 15:
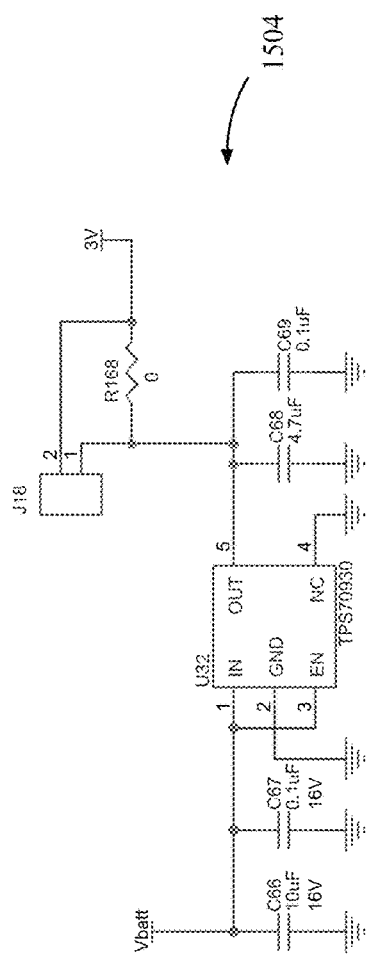
FIG. 15 is a schematic diagram of a power supply for the tracking device of FIG. 5.
Figure 16:
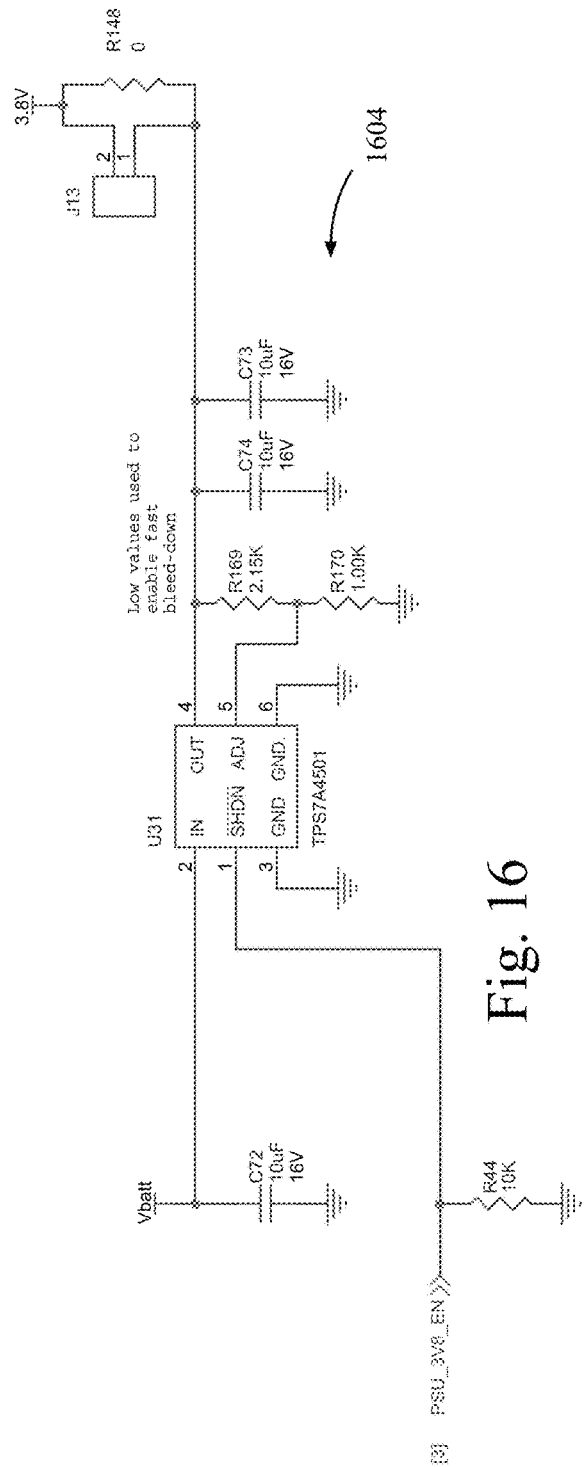
FIG. 16 is a schematic diagram of a modem power supply for the tracking device of FIG. 5.
Figure 17:
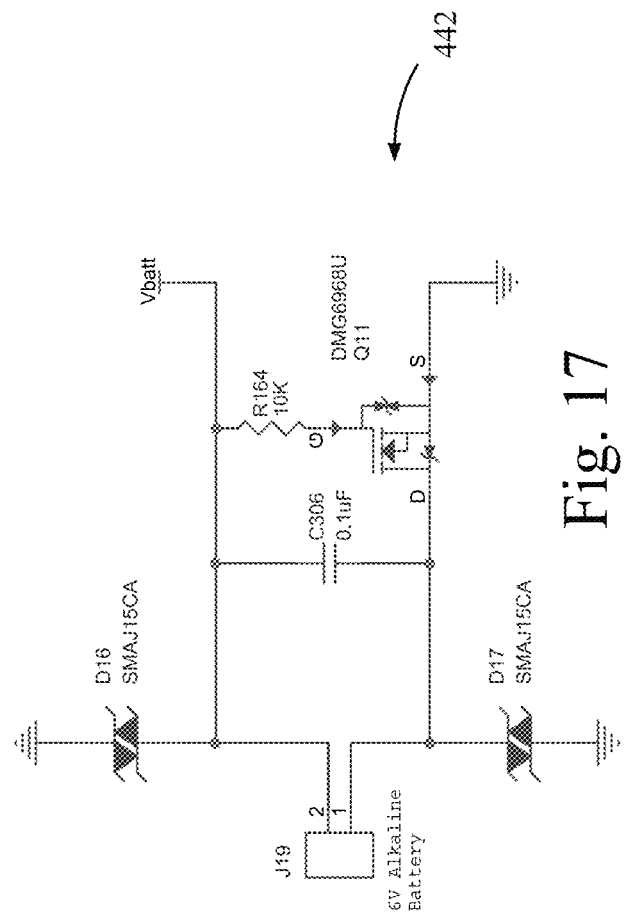
FIG. 17 is a schematic diagram of a battery connector for the tracking device of FIG. 5.

FIGS. 5, 6, 7, 8, 9, 10, and 11 illustrate detailed diagrams of one embodiment of a tracking device 106 that is used in the inventory tracking system 100. FIG. 5 shows a schematic of the tracking device 106 and gives specific examples of different components of tracking device 106. FIGS. 6 and 7 illustrate a schematic diagram of the processor 402. In one example, the processor 402 is an ARM M3 Giant Gecko Micro produced by Silicon Labs® of Austin, Tex. The mobile communication module 426 is shown in FIG. 8. In one example, the mobile communication module 426 is an LTE modem and may include a SIM card connector. FIGS. 9 and 10 show diagrams for the satellite navigation module 434 and the short-range communication module 438. FIGS. 11, 12, 13, and 14 illustrate in greater detail the real time clock 410, the memory 414, the accelerometer 418, and the temperature sensor 422. FIGS. 15, 16, 17 show diagrams of the power supply 1504, the modem power supply 1604, and the battery 442.

Figure 18:
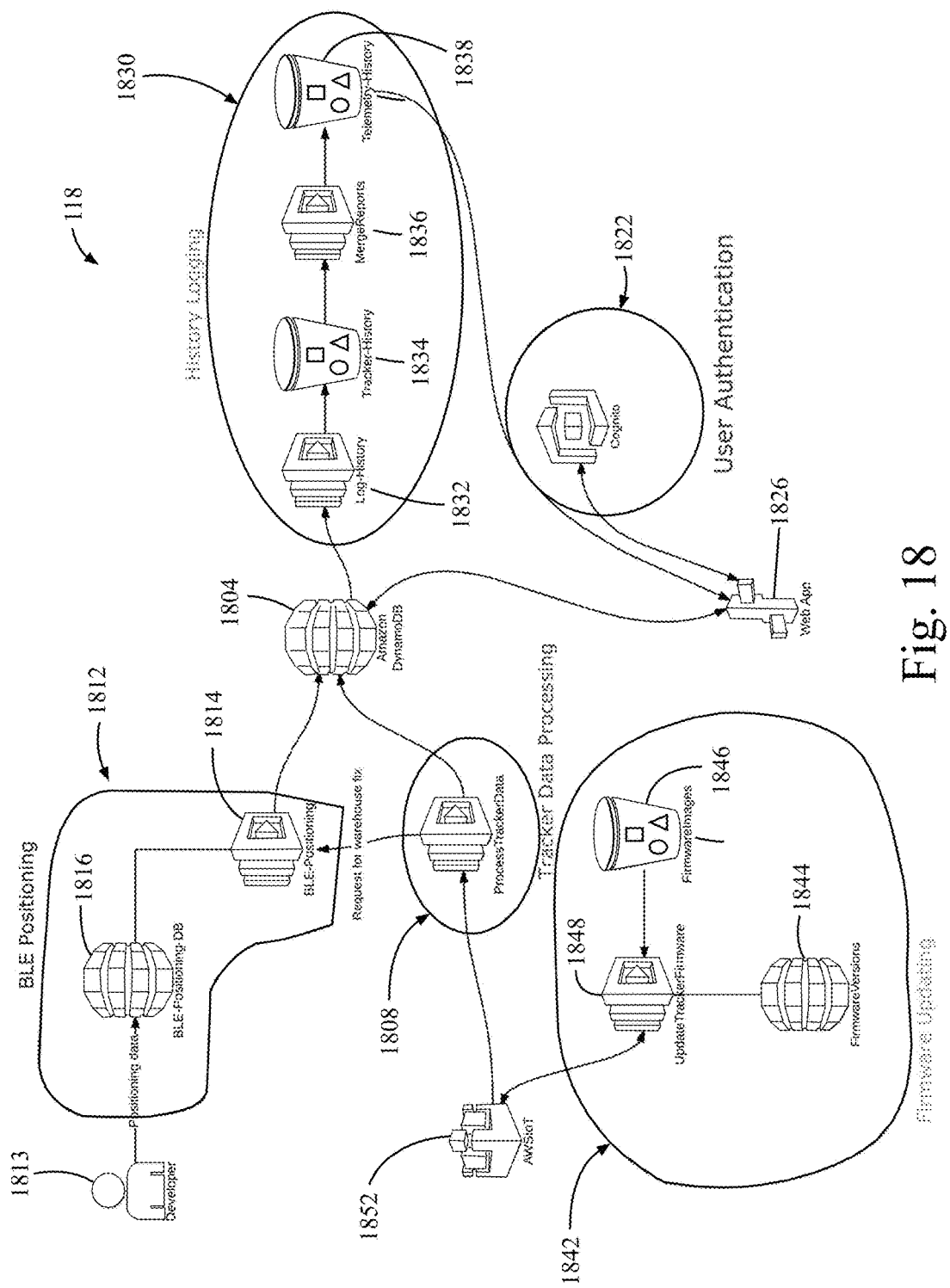
FIG. 18 is a schematic diagram of the architecture of a cloud-based application for the inventory tracking system of FIG. 1.

A diagram showing the architecture of an embodiment of the cloud-based application 118 is shown in FIG. 18. A central database 1804 is hosted by a cloud-based service. Location data is provided to the central database by a tracker data processing application 1808. One method of providing location data is by requesting a position of the tracker using a positioning application 1812. The positioning application 1812 includes a positioning function 1814 for calculating the position of the tracker. The positioning function provides the calculated position data to the central database 1804 and also to a positioning database 1816 where the positioning data is accessible by a user 1818.

The central database 1804 is also accessible to the user 1818 through the use of a user authentication program 1822. The user 1818 enters credentials to have access to a web application 1826 that is able to receive and send information to and from the central database 1804. The central database 1804 provides information to a history logging application 1830. The history logging application includes a log history 1832 and a tracker history 1834 that stores data collected by the tracking device 106. The history logging application also allows the user 1818 to generate and manipulate reports 1836 and to store telemetry history 1838.

Periodically, the tracking device 106 might require a software update to maintain compatibility with the central database 1804. A firmware updating application 1842 is used to provide software and firmware updates. Firmware versions 1844 and firmware images 1846 are provided to a firmware update program 1848. The firmware updates are then transmitted to the tracker data processing application 1808 using a networking platform 1852 such as Amazon Web Services®.

Because the tracking device 106 has the ability to switch between different location techniques, such as satellite navigation, mobile triangulation, dead-reckoning, and short-range communication triangulation, the tracking device 106 can be used to generate location data for a transport structure as it moves over long distances, short distances, and/or if the transport structure is stationary. The tracking device 106 is also capable of determining whether the transport structure is located indoors or outdoors. If the tracking device 106 is able to pick up a GNSS signal via the satellite navigation module 434, it is likely that the tracking device 106 is located outdoors. Similarly, receiving signals with the short-range communication module 438 from short-range communication beacons 136 indicates that the tracking device 106 is likely at an indoor location and/or within a storage facility. Additionally, the tracking device 106 monitors temperature changes from the temperature sensor 422 to determine whether the tracking device 106 is indoors or outdoors. A large, sudden temperature change often indicates movement from an indoor location to an outdoor location.

Figure 19:
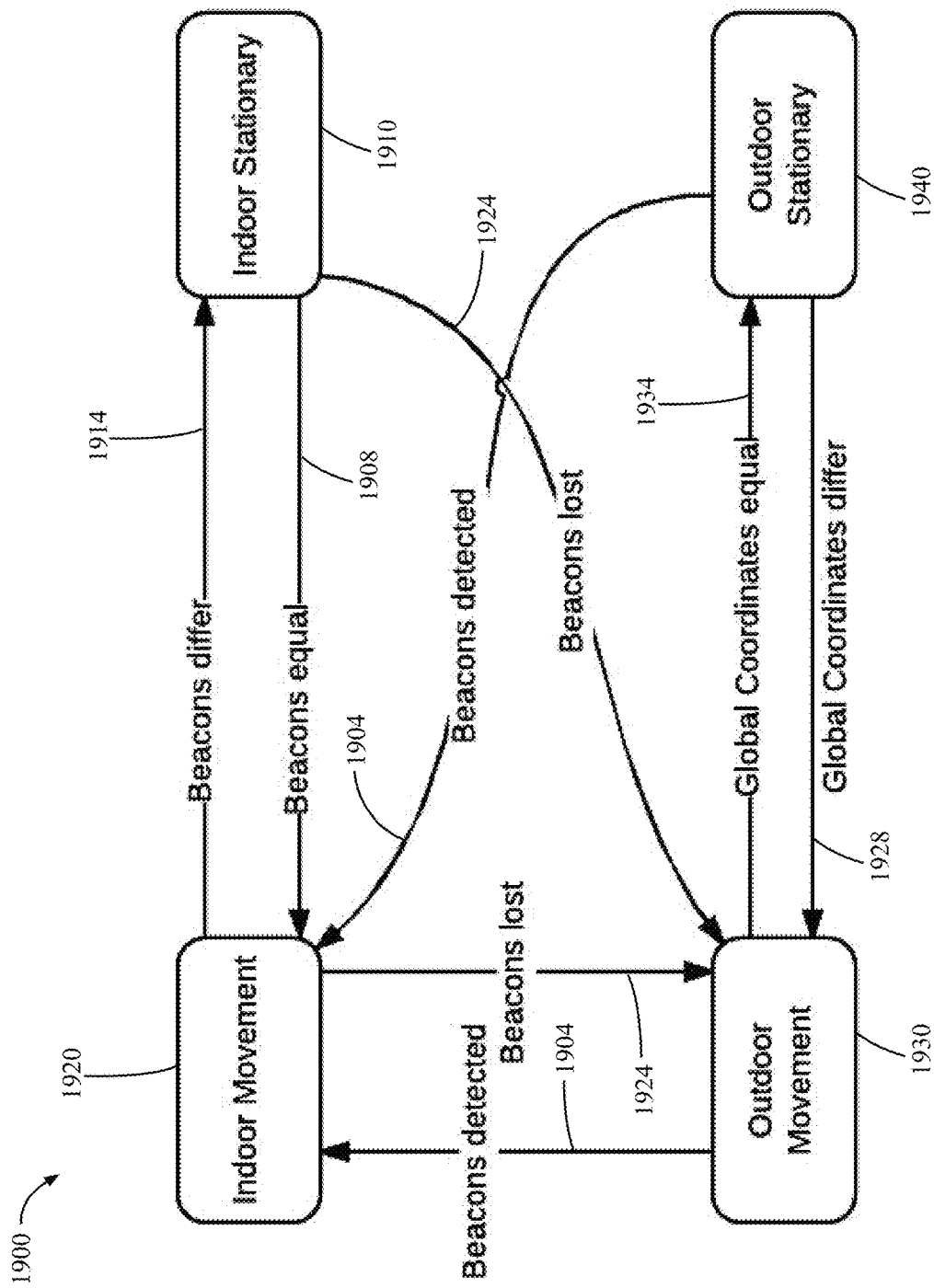
FIG. 19 is a flowchart for determining movement of a transport structure for the inventory tracking system of FIG. 1.

FIG. 19 illustrates a flowchart 1900 for determining movement of a transport structure, such as a pallet 104. When the pallet 104 is not travelling long distances, for example, when the pallet 104 is held in the storage facility 134 such as an indoor warehouse, it is possible that the pallet 104 is within range of a short-range radio signal of the short range beacons 136, such as Wi-Fi access points and/or Wi-Fi routers. In stage 1904, detection of the beacons 136 indicates that the pallet 104 is indoors or within a known storage facility. The tracking device 106 uses these beacons 136 to determine the location of the pallet 104 by measuring signal strength of several beacons 136 that have a known position. The tracking device 106 periodically checks the beacon signal strength 136 via the short-range communication module 438 at desired intervals. If the signal strength of the beacons 136 with respect to the tracking device 106 remains equal across successive intervals, as in stage 1908, then the pallet 104 has likely remained indoor and is stationary, shown in stage 1910. However, if the signal strength of the beacons 136 has changed across successive intervals, as in stage 1914, it is likely that the pallet 104 has been moved within the storage facility, as shown in stage 1920.

In some situations, the signal from the short-range beacons 136 will be lost, like in stage 1924, indicating the pallet 104 has been moved out of range of the beacons 136. One possibility is that the pallet 104 has moved from the storage facility 134 to a different location. Since the short-range beacons 136 are no longer available for determining location, the tracking device 106 may use a different method for calculating location in an outdoor location, such as satellite navigation using a GNSS, dead reckoning, and/or mobile communication triangulation. Checking location at periodic intervals may also indicate whether the pallet 104 is moving outdoors or whether it is stationary. If the coordinates change (stage 1928) across successive intervals, it is likely that the pallet 104 has been moved outdoors, shown in stage 1930. If the coordinates are generally equal or the same across successive intervals, as in stage 1934, it is likely that the pallet 104 has remained stationary (stage 1940).

Figure 20:
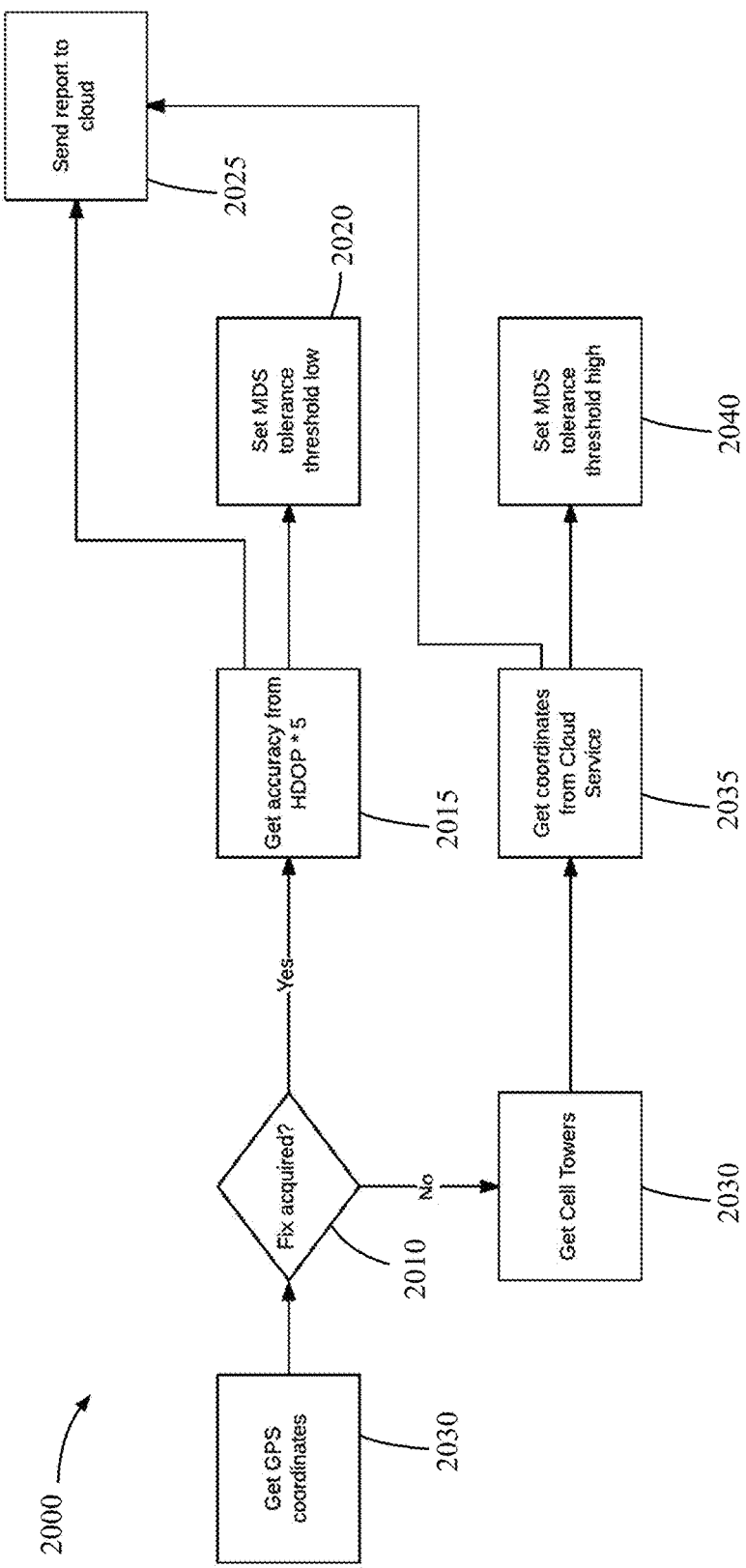
FIG. 20 is a flowchart for choosing a geo-location system to determine the location of the tracking device of FIG. 4.

When the pallet 104 is outside, the tracking device 106 is able to use either the satellite navigation module 434 and/or the mobile communication module 426 to generate location data for the pallet 104. The tracking device 106 chooses which geo-location system module to use based on which system is available, which system is the most accurate, and which system will allow the tracking device to save the most energy. FIG. 20 shows a flowchart 2000 for choosing a geo-location module to determine the location of the tracking device 106. In a first stage 2005, the tracking device 106 attempts to get a signal from the satellite navigation module, such as GPS coordinates. Typically, but not always, the tracking device 106 tries the satellite navigation module 434 first, because satellite navigation is often a more accurate option and consumes less power than mobile communication triangulation. In stage 2010, if the tracking device 106 is able to fix coordinates from GPS, the accuracy of the coordinates is determined using horizontal dilution of precision (HDOP), as shown in stage 2015. Because satellite navigation systems are often more accurate than mobile communication triangulation systems, the multi-dimensional scaling (MDS) tolerance threshold is set to low in stage 2020. In stage 2025, the coordinates are then sent in a report to the cloud-based application 118 where the location data is processed and the location of the tracking device 106 may be accessed by a user over a network 108.

If the tracking device 106 is unable to fix coordinates from a satellite navigation system in stage 2010, then, as shown in stage 2030, the tracking device 106 attempts to connect to cellular telephone towers 112 using the mobile communication module 434. In stage 2035, upon connection to the cellular telephone towers 112, the tracking device 106 determines location coordinates using cellular triangulation. After determining coordinates, the MDS tolerance threshold is set to high (stage 2040). The coordinates are then sent in a report to the cloud-based application 118 where the location data is processed and the location of the tracking device 106 may be accessed by a user over the network 108.

When the pallet 104 is outside, an error compensation method is used to determine whether the pallet 104 is stationary or in motion. If the location of the pallet 104 is determined using GPS, a smaller radius, such as 400 meters, is used to determine whether the pallet 104 has moved. When a less accurate location system, such as cellular triangulation, is used then the error radius is increased, to a two mile radius (3.2 km radius) as an example. These error radii may be increased or decreased as desired depending on the location method used and the relative accuracy of the location method.

Figure 21:
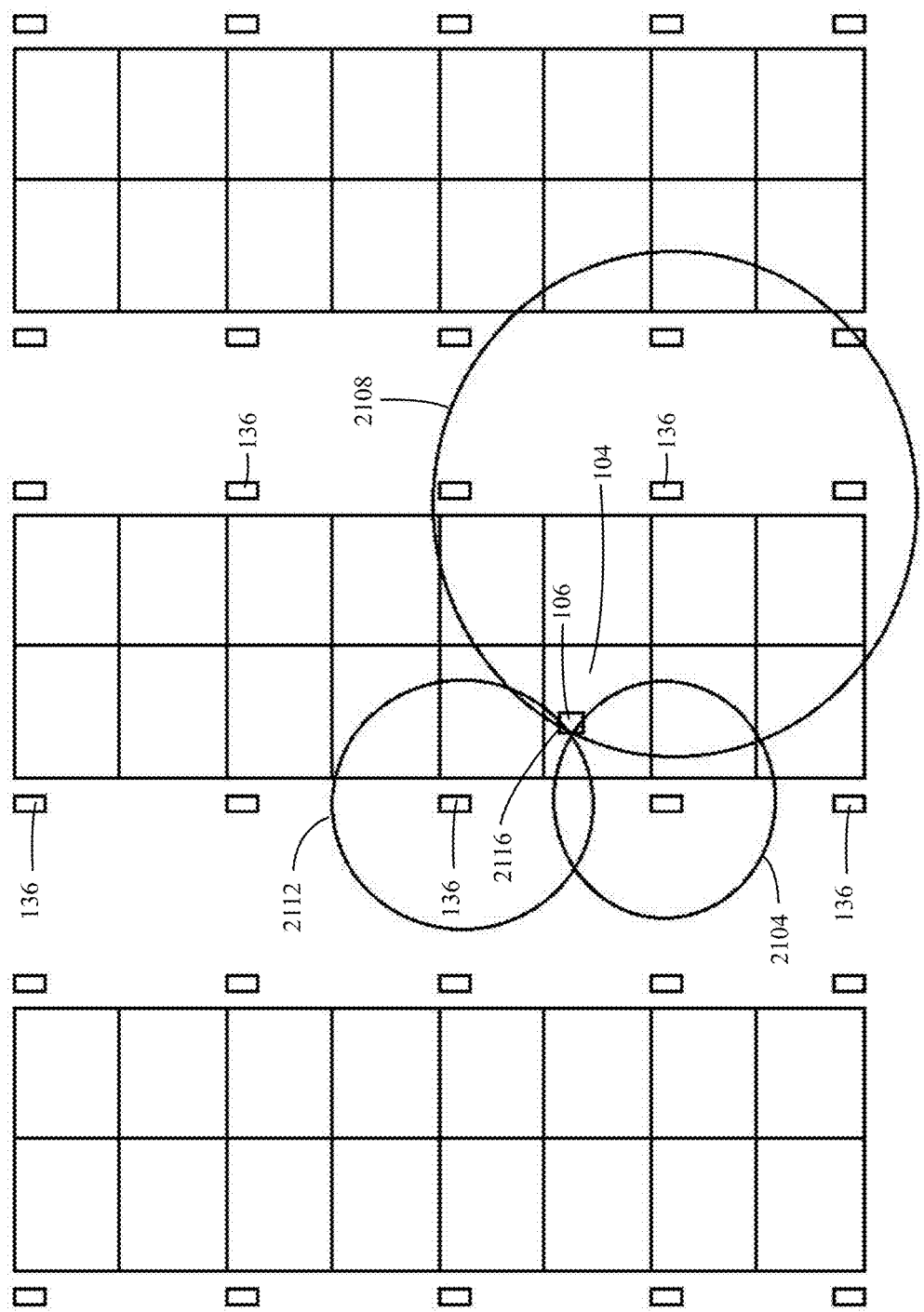
FIG. 21 is a diagram showing location determination of a pallet within a storage facility using short-range communication for the inventory tracking system of FIG. 1.

For tracking within a storage facility, the tracking device 106 uses triangulation of short-range communication signals to determine the location of the pallet 104. As shown in FIG. 21, the pallet 104 is stored in a storage facility 134 that includes an array of short-range communication beacons 136, such as WPAN beacons and/or Wi-Fi beacons, positioned at known locations within the facility. The tracking device 106 via the short-range communication module 438 receives a signal from each of the communication beacons 136 to which the tracking device 106 is within range. The strength of the signal received by the tracking device is used to determine the distance from the tracking device 106 to the short-range communication beacon 136, creating a radius 2104 around the beacon 136 at which the tracking device 106 is located. By determining a second radius 2108 of a second beacon, the possible locations of the tracking device 106 is further limited to the intersections of radius 2104 and radius 2108. Measuring the signal strength of a third beacon 136 creates a third radius 2112, and the intersection 2116 of each of the radii 2104, 2108, 2112 produces a location of the tracking device 106.

In some embodiments, the indoor facility includes more than three short-range communication beacons 136 and the tracking device 106 may receive a signal from each of the beacons 136 or a portion of these beacons 136. In this case, the tracking device 106 is programmed to determine the three beacons 136 that have the strongest average signal strength. These top three beacons 136 are used for location determination as described above.

In some examples, the tracking device 106 is used to find a desired pallet 104 when it is stored in an unknown location in the storage facility 134. A worker looking for the pallet 104 logs into the web application 1826 using a computer 122 and/or a mobile device 126 to search for an estimated location of the desired pallet 104 as reported by the tracking device 106. The location of the pallet 104 is displayed to the worker on the computer 122 and/or mobile device 126. Alternatively or additionally, visible cues like directions to the pallet 104 are displayed, and audible cues are also provided to further assist in locating the pallet 104.

In addition to location data, the tracking device 106 may also provide other details about the transport structure 104. For example, the tracking device can monitor temperature conditions using the temperature sensor 422. This may be important information for transporting perishable items and/or for other items that are temperature sensitive. Alternatively or additionally, the tracking device 106 can use the accelerometer 418 to monitor acceleration of the transport structure. Acceleration data can help determine whether the transport structure has been moved and is also used to determine when the transport structure has been dropped.

Figure 22:
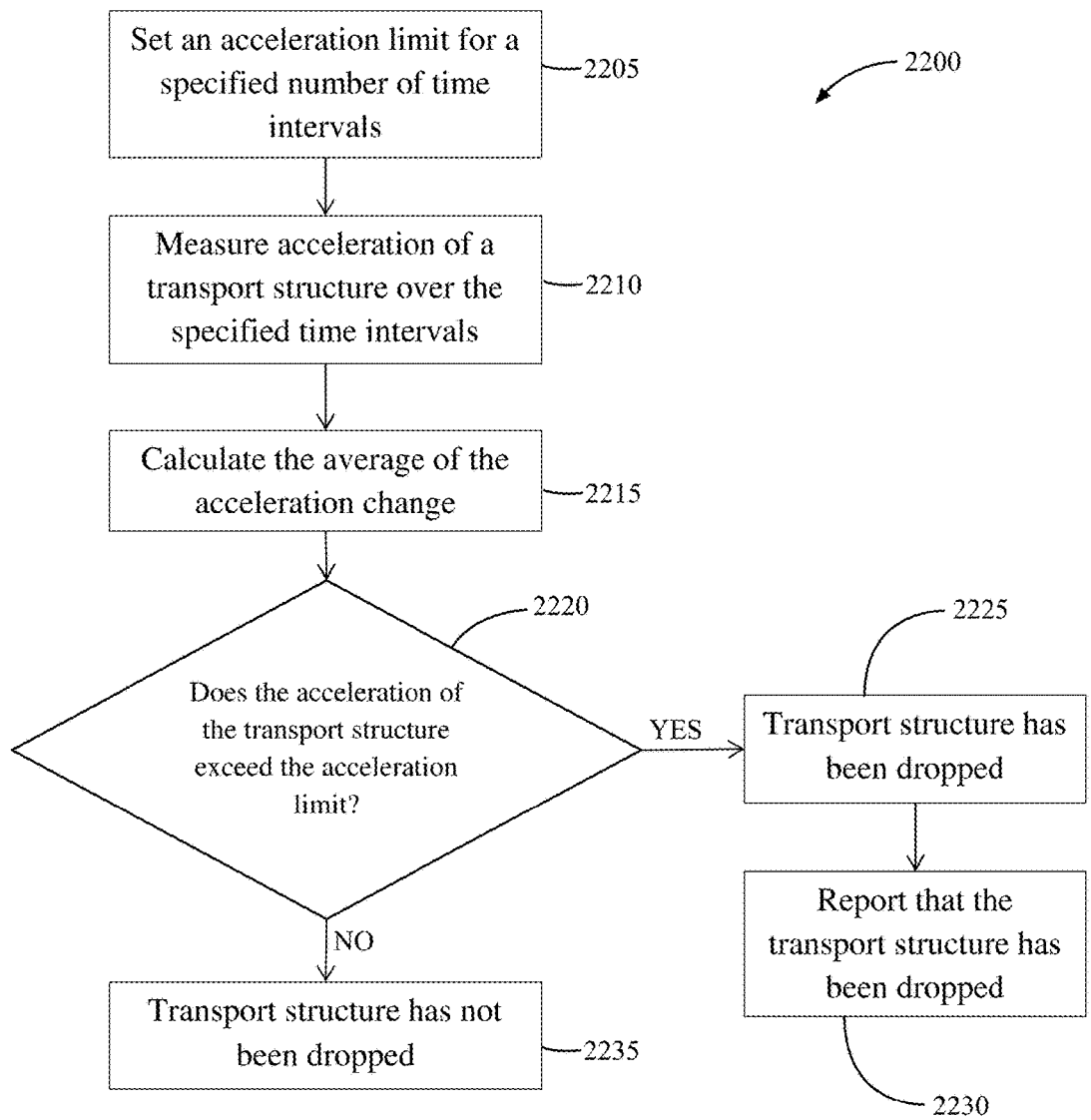
FIG. 22 is a method for detecting a drop using an accelerometer from the tracking device of FIG. 4.

In some embodiments, the accelerometer 418 has a limited range in which to detect acceleration in order to reduce cost and power usage. For example, an accelerometer that can detect at most 1 g (i.e., standard gravity) acceleration is used. However, during a drop, the acceleration is much greater than 1 g, such as 16 g's of acceleration. The flowchart 2200 in FIG. 22 shows a method for detecting a drop using an accelerometer that has a limited acceleration detection range. Although the accelerometer 418 may not be capable of detecting the large acceleration of a drop, the method in flowchart 2200 takes into account that a drop produces a large acceleration over an extended period of time to detect when a drop has occurred. First, in stage 2205, an acceleration limit is set and a specified number of time intervals for which the acceleration is to be experienced to indicate a likely drop is determined and programmed in the tracking device 106. In stage 2210, the acceleration of the transport structure is measured at the specified time intervals over a period of time. In one example, the interval is a 0.5 second interval (i.e., half a second), and the specified number of intervals is four (4) which is two (2) seconds in total. Of course, other time intervals can be used in other examples. The average of the acceleration change is determined over the specified time intervals in stage 2215.

In stage 2220, it is determined whether the measured acceleration of the transport structure exceeds the acceleration limit for the specified number of time intervals. In stage 2225, if the measured acceleration does exceed the acceleration limit, then the transport structure has likely been dropped. Returning to the previous example, when the processor 402 via the accelerometer 418 detects a 1 g or more acceleration over four (4) half second (0.5 second) intervals, then the processor 402 of the tracking device 106 has detected a drop condition where there might be potential damage to the pallet 104 and/or the items carried by the pallet 104. At stage 2230, the tracking device 106 reports the drop at the time that the drop is determined and/or the tracking device 106 saves the acceleration information and reports the drop at the next reporting interval. If, in stage 2220, the measured acceleration of the transport structure does not exceed the acceleration limit for the specified number of time intervals, it is determined that the transport structure has not been dropped and no further action is taken (stage 2235). The accelerometer 418 continues to monitor acceleration of the transport structure 104 even if it is determined that no drop has yet occurred.

To update a user on the progress of a shipment, the tracking device 106 transmits periodic reports to the cloud-based application 118 to be accessed by the user. These reports may include location information, temperature information, acceleration, voltage information, and/or any other desired information that is collected by the tracking device 106. However, transmission of reports, especially by methods such as cellular communication, represents a main source of power usage for the tracking device 106. In order to conserve the power of the tracking device and to extend its lifespan, the timing of the transmission of these reports may be variable. For example, while the pallet 104 is in motion, it may be desired to receive frequent reports to monitor the movement of the pallet 104, so reports are transmitted every hour. However, when the pallet 104 is stationary, it may not be desired to have the tracking device 106 transmit reports as frequently, so reports are transmitted only once a day.

Figure 23:
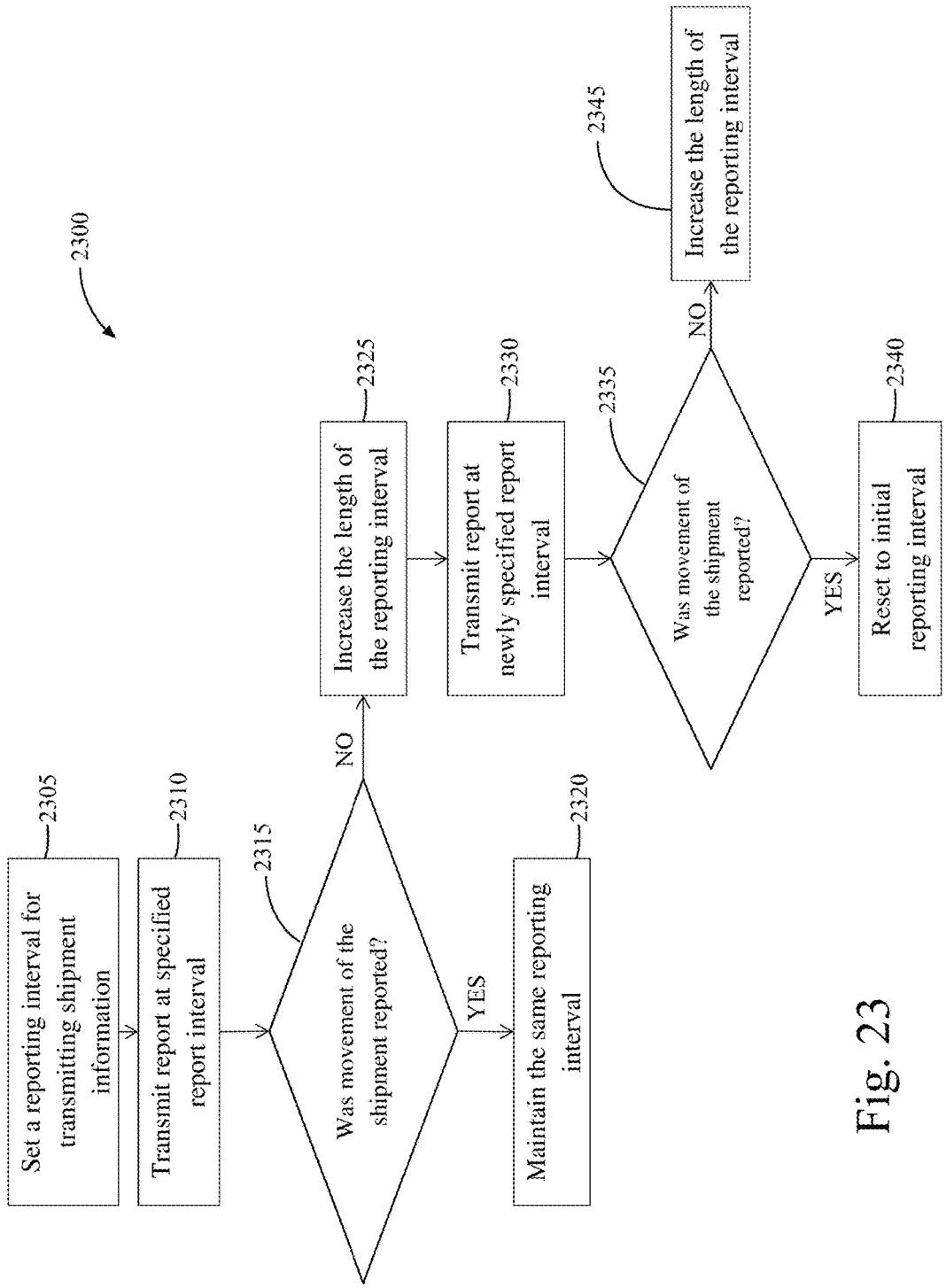
FIG. 23 is a method of determining the reporting interval for the tracking device of FIG. 4.

Flowchart 2300, illustrated in FIG. 23, shows a method of determining the reporting interval for a tracking device 106 based on the activity level of the transport structure. In one form, the tracking device 106 performs all of the acts described with reference FIG. 23, but in other examples, some or most of the acts are performed by or in conjunction with the web-based application 118. In stage 2305, a user sets an initial reporting interval for transmitting shipment information. In a specific example, this reporting interval is set to one hour, so that the default setting of the tracking device is to transmit a report every hour. At the specified time interval, in stage 2310, the tracking device 106 transmits the report to the cloud-based application 118 over the network 108 by any of the available transmission methods, such as via the cellular antenna 112 and/or the short-range communication beacons 136.

In stage 2315, the processor 402 of the tracking device 106 determines whether the location of the pallet 104 has changed since the last report. As shown in stage 2320, if the pallet 104 has moved, then the processor 402 keeps the same, short reporting interval, because the short reporting interval facilitates accurate location tracking as the pallet moves. As shown in stage 2325, if the location of the pallet 104 has not changed since the last report, the processor 402 increases the length of the reporting interval. As noted before, communication, such over cellular networks, consumes a considerable amount of energy in the tracking device 106, especially when establishing the communication circuit through the requisite handshaking protocols. By increasing the reporting intervals, the amount of energy consumed by the tracking device 106 can be decreased so as to increase the operational life of the tracking device 106. The next report is then sent at the newly specified, longer report interval in stage 2330. As an example, the reporting interval is doubled when the processor 402 of the tracking device 106 determines the pallet 104 is stationary. If the default reporting interval is set to one hour and the pallet 104 is stationary, then the following reporting interval is then set to be two hours.

Whether the pallet 104 has remained stationary or moved is determined again after the next report transmission in stage 2335. If it is observed that the pallet 104 has been moved, the processor 402 resets the reporting interval to the initial time interval (e.g., one hour) at stage 2340. If it is observed that the pallet 104 has remained stationary, the length of the reporting interval may be increased again at stage 2345 by the processor 402. As an example, the length of the reporting interval is doubled from two hours to four hours. This procedure can be repeated and the length of the reporting interval can be continually increased as the pallet 104 remains stationary. A user may also set a maximum reporting interval so that the length of time between reports does not become longer than the maximum reporting interval. For example, a maximum time interval of 24 hours is set so that the tracking device 106 at least sends one report each day even while the pallet 104 is stationary. In another example, the reporting intervals increase in the following progression: 1 to 2 hours; 2 to 4 hours; 4 to 8 hours; 8 to 12 hours; 12 to 24 hours; and 24 to 24 hours (i.e., remains at a 24 hour maximum interval). Even when the intervals are increased, the processor 402 can cache all or most of the data normally collected in memory 414 so that the same data collected between reporting intervals can be transmitted from the tracking device 106 to the cloud-based application 118. A significant amount of power is wasted by the tracking device 106 to establish a network connection (e.g., handshaking), such as with a cellular network. With this technique, the same data is available to the cloud-based application 118, but less energy is used by the tracking device 106 because more data is packed in a single communication.

Whether the pallet 104 has moved or is stationary can be determined by defining a stationary radius or geo-fence to account for potential errors in location determination at successive intervals. While the technique will be described with reference to a stationary error radius limit, which connotes a circular area, the geo-fence stationary error limit can include non-circular and/or irregular geo-fence locations. For instance, the geo-fence error limit can include square, octagonal, or other shapes. Known (or even unknown) interference sources that impact location accuracy, such as radio interference sources, structures, and other impediments, can be incorporated into the calculations that determine the error limit for determining whether the pallet 104 is stationary or not. In one form, the processor 402 of the tracking device 106 determines whether or not the pallet 104 is within the error range of the geo-fence. In another example, some or all of the stationary geo-fence location calculations are performed by the cloud-based application 118. In one example, the processor 402 of the tracking device 106 stores the location information in memory 414 and performs an error calculation between two sequential location measurements to determine whether the pallet 104 has moved. In one form, the stationary radius is a distance that is measured between sequentially measured locations of the pallet 104, and in other forms, non-sequential or non-successive location measurements and/or statistical measures are used to determine whether the stationary error limit or geo-fence is exceeded. For instance, the stationary error limit or radius in certain examples is based on the range and/or standard deviation of location measurements for a specified time period. In one example where the cloud-based application 118 determines the stationary error radius, the tracking device 106 transmits location data in a first report and then sends location data in a second report after waiting for the reporting interval. In this example, the cloud-based application 118 compares the location of the pallet 104 in the second report to the location of the pallet 104 in the first report. In another example, a single communication from the tracking device 106 includes multiple location measurements, and the cloud-based application 118 determines the stationary radius based on this location information transmitted in the single communication.

As noted before, the tracking device 106 and/or the cloud-based application 118 can determine if the pallet 104 is stationary by checking to see if the calculated stationary radius error exceeds a limit. For instance, if the location of the pallet 104 is determined to be within the stationary radius error limit, then the pallet 104 is determined to be stationary. If the location of the pallet 104 is outside of the stationary radius error limit, the tracking device 106 and/or cloud-based application 118 considers the pallet 104 to have moved.

The size of the stationary radius depends on the accuracy of the location technique used to determine the location of the pallet 104. For example, the stationary radius is 400 meters when the satellite navigation module 434 of the tracking device 106 is used to determine the location of the pallet 104, but the stationary radius is 3200 meters when the mobile communication module 426 is used to determine the location of the pallet 104. In another example, the stationary radius error limit is 10 meters when the short-range communication module 438 is used to locate the tracking device through WPAN (e.g., BLUETOOTH®) and/or WPS location triangulation techniques. Having the cloud-based application 118 determine whether or not the pallet 104 is stationary offloads processing from the tracking device 106, which in turn can conserve power on the tracking device 106 as well as allows the tracking device to use less expensive and/or energy efficient processors 402. When the cloud-based application 118 determines the pallet 104 is stationary or not, the cloud based application 118 can communicate immediately or during the next communication (or a subsequent communication) with the tracking device 106 to adjust the communication interval accordingly. For instance, when the cloud-based application 118 determines the pallet 104 is stationary, the cloud-based application 118 can instruct the tracking device 106 to increase (e.g., double) the communication interval in the manner as described above, and the cloud-based application 118 can communicate with the tracking device 106 to reduce the communication interval when the location exceeds the error radius limit which signifies movement. When the tracking device 106 determines whether or not a stationary radius error limit has been exceeded, no communication between the cloud-based application 118 and the tracking device 106 is needed in order to adjust the communication interval which in turn can conserve power. For instance, the processor 402 of the tracking device 106 can automatically increase the reporting interval (e.g., double it) when the location remains within the geo-fence error limit, and the processor 402 automatically reduces the reporting interval in the manner described above when the error limit is exceeded which indicates pallet movement.

In conjunction with the periodic reports, scans for short-range communication beacons 136 such as scanning for WPAN Low Energy beacons and/or scanning for Wi-Fi beacons can also be performed at specified intervals that are independent of the reporting intervals. Because short-range communication scanning typically uses less power than GNSS and/or cellular tower acquisition, it is often more efficient to maintain short-range communication scanning at a more frequent interval than the reporting interval. The short-range communication module 438 can be used to triangulate pallet location such as when the pallet is located inside a structure, such as a warehouse or manufacturing plant. In one form, similar location radius or geo-fence limit techniques are used to determine whether or not the pallet 104 has moved. If no motion is detected from the short-range communication scan and/or no report is scheduled at that time, the tracking device 106 returns to sleep mode to conserve power until the next reporting interval or the next short-range communication scan. Before entering the sleep mode, the processor 402 in one example stores the location from the short-range communication module 438 and/or other information in memory 414 which can be reported at the next reporting interval.

Alternatively or additionally, if the short-range communication scan indicates a significant change in the received signal strength indication (RSSI) or if the scan indicates that the ID of the strongest beacons 136 has changed, then movement of the pallet 104 is indicated. In some embodiments, movement detected by the short-range communication module 438 initiates a report. In some embodiments, detected movement also modifies the length of the reporting interval by resetting the reporting interval to an initial reporting interval. If the short-range communication scan indicates that no beacons 136 are within range, but a previous scan had detected a beacon 136, movement of the pallet 104 is detected and the reporting interval is reset to the default reporting interval. To conserve power, the tracking device 106 in one example is designed to track location of the pallet 104 and communicate via the beacons 136 whenever possible. For instance, when location tracking and communication is possible through the short-range communication module 438, the mobile communication module 426 and the satellite navigation module 434 are placed in a low power (or no power) mode. Once the tracking device 106 is unable to detect location and/or communicate via the beacons 136, the tracking device 106 powers on and switches to location detection and/or communication via the satellite navigation module 434 and/or mobile communication module 426. In other examples, hybrid approaches are used to detect location and/or assist in communication. For example, aGPS can be used to detect location through the mobile communication module 426 and the satellite navigation module 434. Other hybrid approaches include communication of the tracking device 106 through the short-range communication module 438, and location detection of the tracking device occurs through a combination of location triangulation through the accelerometer 418, the mobile communication module 426, the satellite navigation module 434, and/or the short-range communication module 438.

In some embodiments, it is possible that characteristics other than movement cause the tracking device 106 to transmit a report and/or to reset the reporting interval to the default interval. The measurement of a predetermined maximum or minimum temperature value by the temperature sensor alerts the tracking device 106 to send a report. For example, a tracking device 106 for a pallet 104 carrying temperature sensitive food is programmed to send a report whenever the temperature rises above 35 degrees Fahrenheit, and the reporting interval is maintained at the default reporting interval while the temperature remains above 35 degrees Fahrenheit, even when the pallet 104 is stationary. Alternatively or additionally, acceleration measurements from the accelerometer 418 that are above a certain threshold can prompt the tracking device 106 to send a report and/or to reset the reporting interval to the default reporting interval.

In a further power saving effort, the tracking device 106 may be programmed to use a best effort algorithm for reporting data when the temperature is cold. In one example, the tracking device 106 is powered by alkaline batteries, and the power level of the batteries is sensitive to cold temperatures. In order to avoid power failure due to cold weather, when the temperature drops below a minimum value, the tracking device 106 generates a report at the regular reporting interval, but caches the data in memory rather than transmit the data to the network 108. The data stored in memory is transmitted at a later time or later reporting interval when the temperature has increased above the minimum reporting temperature. This process allows the tracking device 106 to avoid using the power necessary to transmit the data in cold weather, saving transmission for a time and temperature that is more power efficient.

In addition to reporting at the regular reporting intervals, tracking device 106 and/or cloud-based application 118 can be programmed to send alerts when certain conditions are met. An alert may be location-based, time-based, route-based, or triggered by unauthorized movement. For example, an alert is triggered by the tracking device 106 reaching a specific location or is triggered by measurements made by the temperature sensor 422 and the accelerometer 418. As an example, the tracking device 106 and/or cloud-based application 118 is programmed to send an alert when the temperature drops below a given minimum temperature and/or when the temperature rises above a given maximum temperature. Likewise, in other embodiments, the tracking device 106 is programmed to send an alert when the accelerometer measures an acceleration above a certain threshold value (e.g., a drop is detected). In some embodiments, these alerts show up on the display of the web application 1826, and/or the alert is in the form of a push notification and/or text message to the mobile device of the user. Additionally, it is possible to use other forms of notification to alert a user, such as auditory alerts.

Figure 24:
FIG. 24 is a screenshot of an inventory tracking map for the inventory tracking system of FIG. 1.
Figure 25:
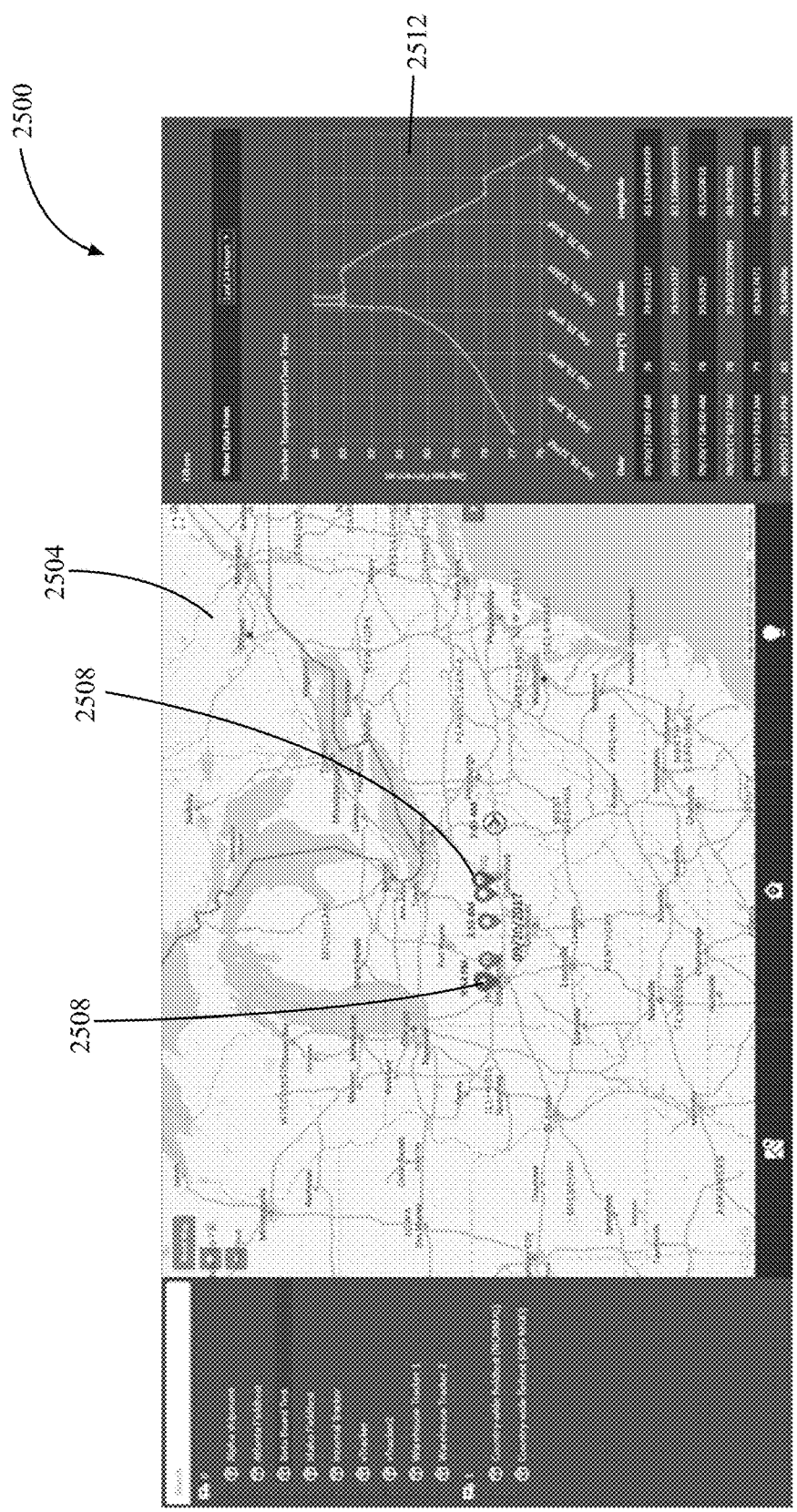
FIG. 25 is a screenshot of an inventory tracking map for the inventory tracking system of FIG. 1.

Data transmitted by the tracking device 106 to the cloud-based application 118 is accessible to a user through a web application 1826. The data is processed so that the web application 1826 organizes the information collected by the tracking device 106 so that it is easily viewed and analyzed by the user. As an example, FIG. 24 shows an example of an inventory map 2400 that displays the reported locations 2404 of different shipments. A graphical user interface introduces a toolbar 2408 that is used to choose to see more detailed information regarding individual shipments. As shown in the shipment profile 2500 in FIG. 25, selecting a desired shipment in the toolbar 2408 allows for a closer analysis of the data reported for that shipment. The map 2504 in shipment profile 2500 displays specific reported locations of the shipment 2508 and the time at which the location was reported. Shipment profile 2500 also displays a graph 2512 of the temperature reported by the tracking device over the duration of the shipment.

Figure 26:
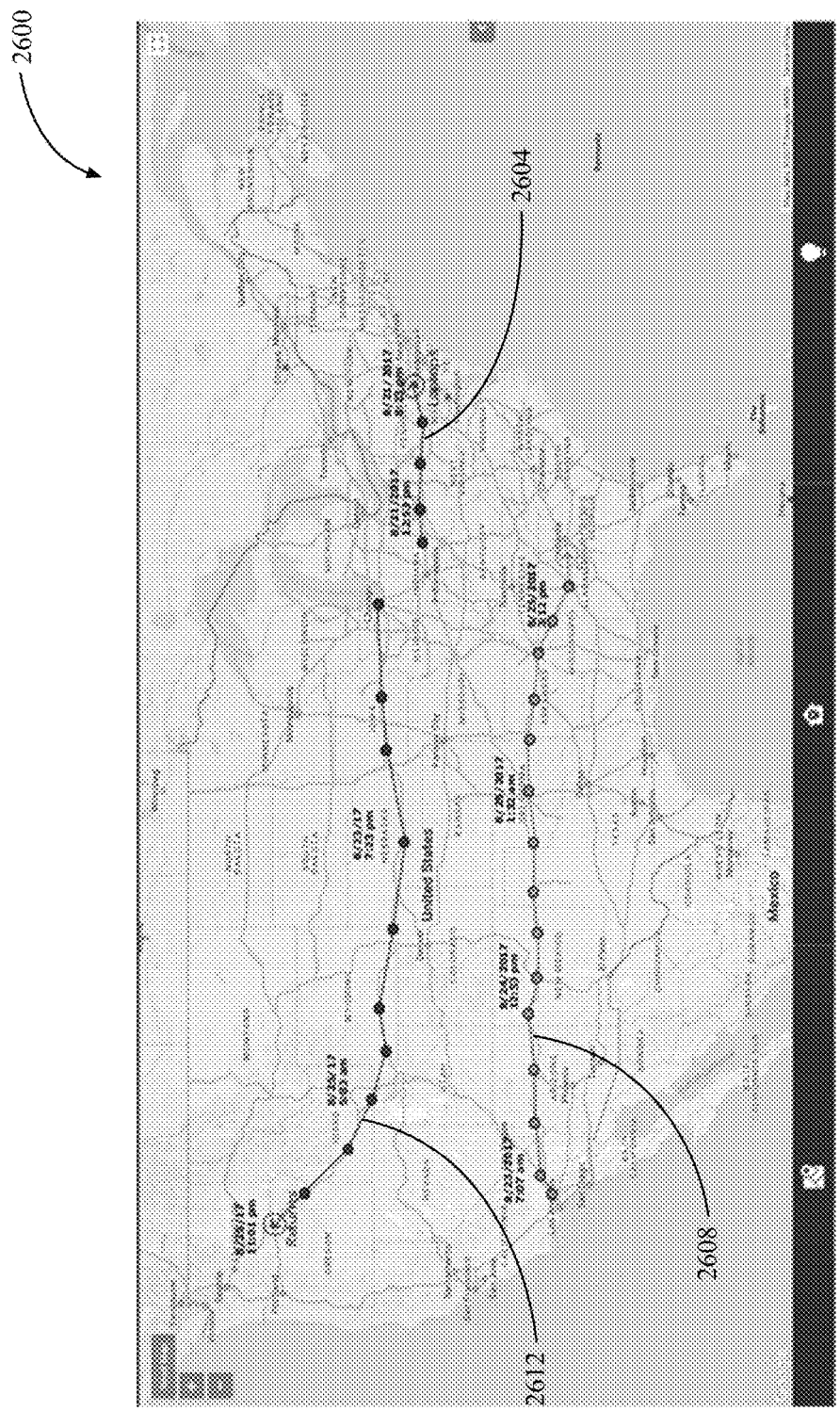
FIG. 26 is a screenshot of an inventory tracking map for the inventory tracking system of FIG. 1.

FIG. 26 illustrates a map 2600 showing the location data history for several different shipment routes 2604, 2608, 2612. Each data history includes a point to mark the location reported and connects adjacent reported locations with a line to show the transit path. Dates and times are given for several reported locations along the shipment routes 2604, 2608, 2612 to provide more detailed information regarding the shipment.

Figure 27:
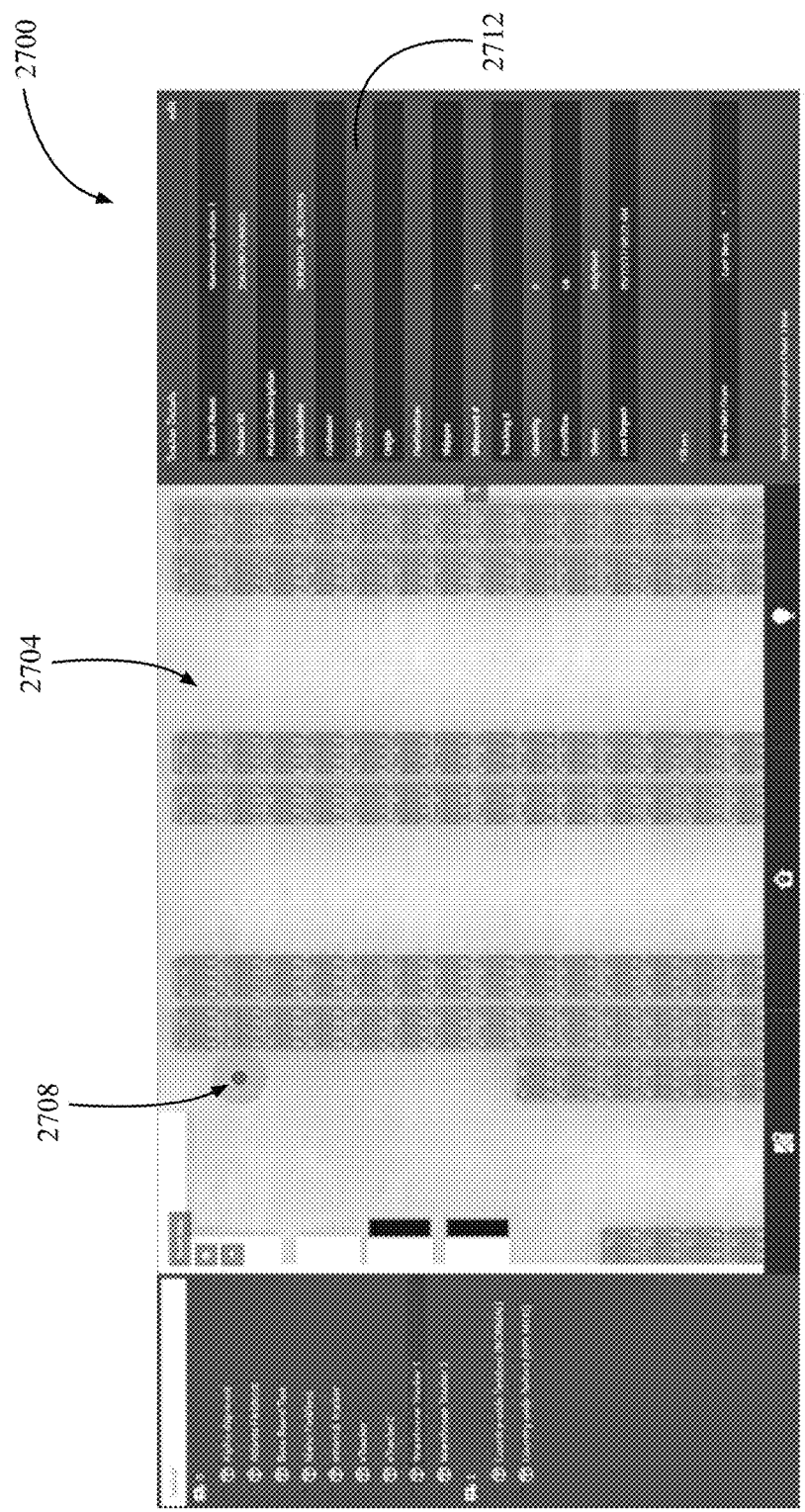
FIG. 27 is a screenshot of a guided user interface for locating a transport structure in a storage facility for the inventory tracking system of FIG. 1.

A web application display 2700 for locating a pallet 104 stored in a storage facility, for example in a warehouse 2704, is shown in FIG. 27. The display 2700 includes a layout of the warehouse 2704, including the location of other pallets and other stored inventory. A location indicator 2708 provides the location of the tracking device 106 and the pallet 104 on which the tracking device 106 is attached to within the warehouse 2704. The display 2700 also includes a table 2712 with additional information for the selected pallet. This additional information may include the customer name, the date the tracking device was introduced into the warehouse 2704, as well as other shipment information such as the origin of the pallet and the eventual destination. Other information that is collected by the tracking device 106 regarding the characteristics of the shipment is also displayed in table 2712 as desired.

Figure 28:
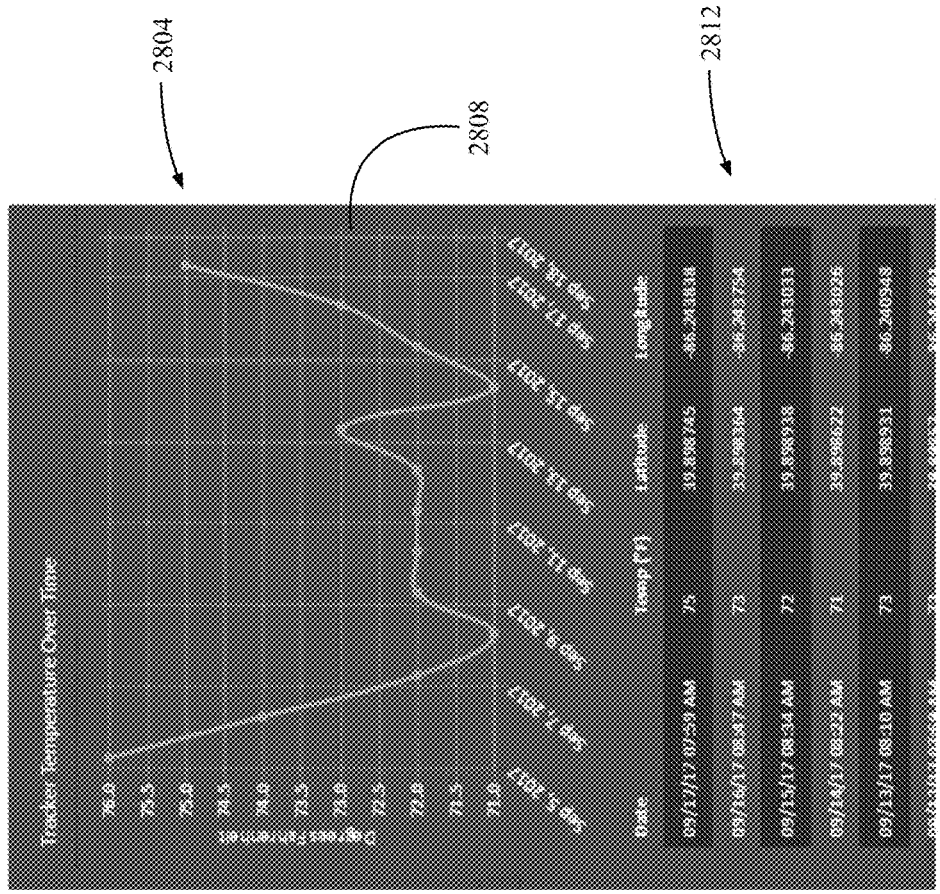
FIG. 28 is a screenshot of a temperature tracker for the inventory tracking system of FIG. 1.

An example of a temperature tracker 2804 displayed on the web application 1826 is shown in FIG. 28. The temperature tracker 2804 provides a graph 2808 of the temperature recorded by the temperature sensor 422 of a tracking device 106 as a function of time. A table 2812 displaying the date of the temperature measurement, the temperature measured, and the location of the tracking device 106 is provided beneath graph 2808.

Figure 29:
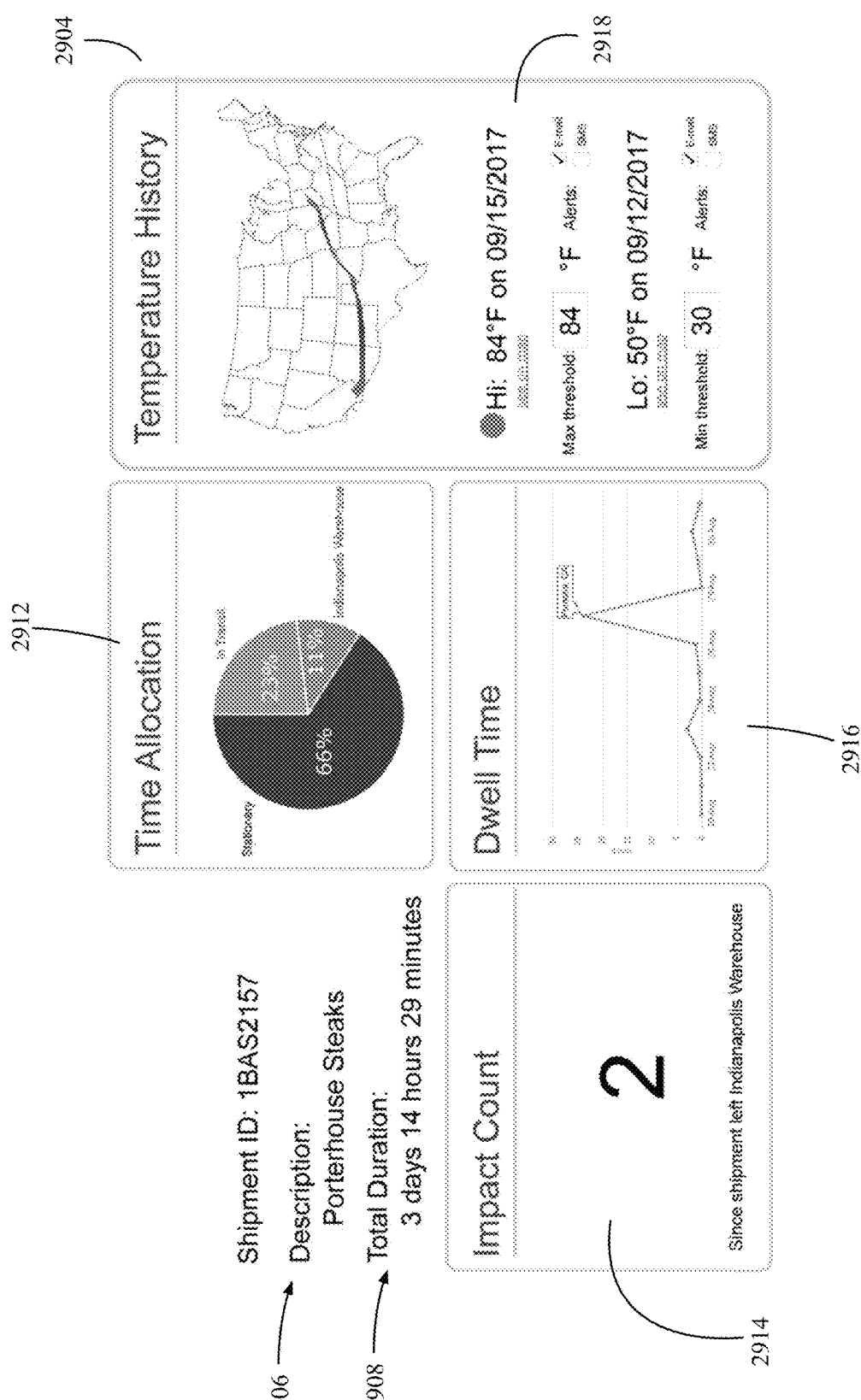
FIG. 29 is a screenshot of a general report for the inventory tracking system of FIG. 1.

FIG. 29 illustrates a general report 2904 that is available to the user on the web application 1826. The general report provides a description 2906 of the shipment being tracked and the total duration of the shipment 2908. A chart 2912 visualizing the time allocation displays the time that the shipment has been stationary, in transit, and spent sitting in the storage facility. The general report 2904 also includes an impact count 2914 that displays the number of times the shipment has been dropped and/or experienced a high acceleration event as measured by the accelerometer 418 as described in flowchart 2200 in FIG. 22. A dwell time graph 2916 displays the time the shipment remained stationary as a function of time. Additional information is provided on the dwell time graph 2916, such as the location of particularly long dwell times. A temperature history 2918 is also provided in the general report 2904. The temperature history 2918 shows a map that visualizes the temperature of the shipment at various locations along the shipment route. Additional information, such as the highest recorded temperature and the lowest recorded temperature, as well as a comparison of these temperatures to the maximum and minimum temperatures is also displayed.

The web application 1826 also includes a control page that allows a user to activate or deactivate certain features of individual tracking devices 106 or groups of tracking devices 106. For example, the control page includes a switch for turning off location tracking and/or to turn off the temperature sensor 422. The control page also allows a user to activate or deactivate features under certain conditions. For example, the accelerometer 418 can be deactivated to turn off drop detection when the shipment is in a certain location and/or when the temperature is below a certain value. The control page also allows the user to place one or more tracking devices 106 into airplane mode to allow data to be recorded but to not allow transmission of the data. For instance, when the tracking device 106 is determined to be located at or near an airport, the tracking device 106 can be automatically switched to an airplane mode so as to avoid any interference with airplane communication and/or avionics systems. Groups of tracking devices 106 can be tagged so that certain features can be activated or deactivated at the same time either manually by the user or automatically by the cloud-based application 118.

It should be recognized that the displays shown in FIGS. 24, 25, 26, 27, 28, 29 are simply examples of different layouts that may be used in the web application 1826 to be reviewed and analyzed by the user. The web application 1826 can be modified and arranged as desired to create different layouts of the data collected by the tracking device 106 as desired by the user.

Figure 30:
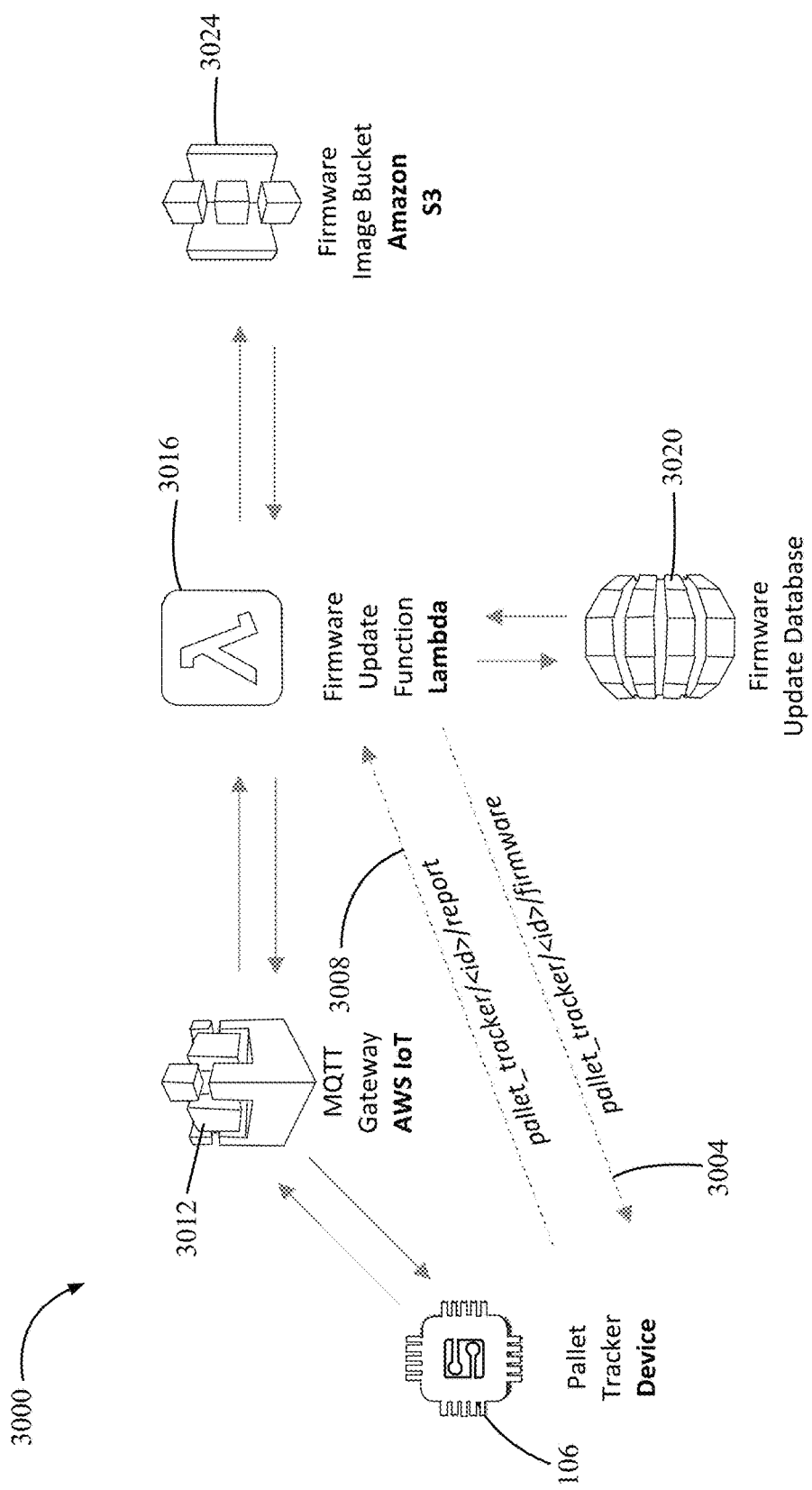
FIG. 30 is a flow diagram for updating a tracking device via an over-the-air firmware update.

FIG. 30 shows a diagram 3000 illustrating a method of updating the tracking device 106 via an over-the-air firmware update. The tracking device 106 subscribes to a firmware topic 3004 that includes a unique identification (<id>) for the tracking device 106. The tracking device 106 then publishes a report topic 3008 that includes the unique identification for the tracking device 106.

The message queueing telemetry transport (MQTT) gateway 3012 forwards messages from the tracking device 106 report to the firmware update function 3016. The update function 3016 compares the firmware version in the tracking device 106 to the firmware version number listed for the tracking device in the firmware update database 3020 to determine whether an update for the tracking device is available. To determine whether an update is available, the update database 3020 version number is compared to the tracking device 106 version number. If the version numbers are the same and/or the update database 3020 version number cannot be found, then the update function 3016 sends a message to the tracking device 106 that no update is available.

If the version numbers of the update database 3020 and the tracking device 106 are not the same, then the update function 3016 sends a message to the tracking device 106 over the firmware topic 3004 indicating that an update will occur. This message contains information such as firmware file size, number of packets, cyclic redundancy check (CRC) checksum, and/or other information regarding the firmware update. The update function 3016 then begins transmission of the firmware update from the firmware image bucket 3024 to the tracking device 106 in discrete transfer messages. The tracking device stores each message into a buffer, and copies the buffer into the correct location in the SPI flash memory 414. The next message is received, and this process continues until the entire file is transferred.

After receiving the entire file, the tracking device 106 calculates a CRC checksum of the image stored in the SPI flash memory 414 and compares the checksum to the initial checksum received from the update function 3016. If the checksums match, a sentinel value is set in the SPI flash memory 414, indicating that the firmware is valid. Then, the next time that the tracking device 106 is active, the tracking device 106 checks for the sentinel value in the SPI flash memory 414, and if the sentinel value is set, the firmware is copied from the SPI flash memory 414 to the internal flash memory. The SPI flash image of the firmware is erased, the sentinel value is cleared, and the new firmware is booted from the internal flash memory.

Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Ambient energy source" generally refers to an energy source that produces energy using energy from external, natural sources that are present in the environment. Some examples of ambient energy include, but are not limited to, solar energy, hydroelectric energy, wind energy, thermal energy and piezoelectric energy.

"Beacon" or "beacon transmitter" generally refers to a system or apparatus configured to transmit data using electromagnetic energy. The broadcasted data may include any suitable data such as a string of alphanumeric characters uniquely identifying one beacon from others in the environment. Data may appear in a single field in a datagram, or in multiple separate fields. Any suitable protocol may be used to create and transmit the datagrams using any suitable arrangement of fields. The fields may include predetermined numbers of bits according to proprietary or commercially available protocols. One example of a commercially available protocol is the BLUETOOTH® LE (Low Energy) protocol, also referred to as BLUETOOTH® Smart protocol.

Datagrams may include one or more fields that may include a preamble, one or more header fields, an access address field, a Cyclical Redundancy Check (CRC) field, a Protocol Data Unit (PDU) field, a Media Access Control (MAC) address field, and a data field. The data field may include an prefix and a proximity Universal Unique Identifier (UUID) which may be configured to distinguish beacons used by one organization from those of another organization. Other data fields may include a major field which may be used to identify multiple beacons as a group, a minor field which may uniquely identify a specific beacon within a group, and a transmission power field which may indicate how far a beacon is from a receiver. The transmitter power field may include one of a set of data values representing distance ranges such as "immediate", "far", or "out of range". A transmission power field may also include more detailed ranging data such as the Received Signal Strength Indication (RSSI) of the beacon at a predetermined range such as 1 meter away. This value may be compared to a current RSSI measured by a receiver and used to calculate an approximate range.

A beacon may include a receiver allowing the beacon to begin broadcasting after receiving a signal from another transmitter. In one example, a beacon may collect energy from the electromagnetic energy directed toward it and may use this energy to transmit its data in response. This type of "passive" beacon may only transmit when energized to do so by some other transmitter. In another example, beacons may have a local power source such as a battery and may transmit continuously and/or at predetermined intervals. In either case, the data sent by the beacon may pass through walls or other objects between the beacon and a receiver making it unnecessary to maintain an unobstructed line of sight between the two.

A beacon may transmit on any suitable frequency or group of frequencies in the electromagnetic spectrum. For example, a beacon may transmit in the Very High Frequency range (VHF), the Ultra High Frequency range (UHF), or in the Super High Frequency range (SHF). Transmissions from a beacon may be directed along a narrow beam by a directional antenna system used by the beacon, or the beacon may use an omnidirectional antenna system configured to broadcast the data in all directions at about the same time. In one form, the beacon is an off-the-shelf product that is purchased.

The data may be programmed in a memory such as a nonvolatile memory in the beacon for repeated transmission at predetermined intervals. For example, transmissions may be repeated up to about every 500 ms, up to about every 2 seconds, up to about every 30 seconds, or at intervals greater than 30 seconds apart. Beacons may transmit at a very low Transmitter Power Output (TPO) and/or Effective Radiated Power (ERP). TPO or ERP may be less than about 100 milliwatts, less than about 10 milliwatts, or less than about 1 milliwatt.

Examples of commercially available suitable beacon transmitters include beacons available from Estimote, Inc. of New York, N.Y., USA, or from Gimbal, Inc., of San Diego, Calif., USA.

"Cargo" or "cargo items" is used in a broad sense to generally refer to goods or other physical objects that are typically carried or otherwise transported on vehicles, such as on trucks, ships, aircraft, spacecraft, and/or motor vehicles. The cargo items can be unpackaged or packaged, such as in boxes, bags, bales, containers, barrels, and tanks, to name just a few examples.

"Cargo carrier" generally refers to any structure used to transport and/or store cargo items, such as flatbed trailers, trailers, semitrailers, trucks, intermodal containers, refrigerated trailers, and railcars, to just name a few examples. The cargo carrier can be transported in any number of ways, such as over land, sea, space, and/or air. Certain type of cargo carriers, like intermodal containers, are designed to be transported in a number of manners, such as via a truck, in a ship, and via rail. The cargo carrier can be fully enclosed, such as when in the form of a semi-trailer or cargo container, or open to the outside environment, such as with a flatbed trailer.

"Cloud-based application" generally refers to any program stored on a remote server or group of servers and that is accessible by a network, such as the internet. The program can be designed to perform any desired function and may be accessible by any device that is capable of accessing the network.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Electromagnetic Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source.

Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels.

The photon is the quantum of the electromagnetic interaction, and is the basic constituent of all forms of electromagnetic radiation. The quantum nature of light becomes more apparent at high frequencies as electromagnetic radiation behaves more like particles and less like waves as its frequency increases.

"Geo-fence" generally refers to a virtual boundary generated for a real geographical area. The virtual boundary defined by a geo-fence may be monitored using a positioning system and/or any other form of location-based service.

"Item" or "Stock Keeping Unit (SKI)" is used in a broad sense to generally refer to an individual article or thing. The item can come in any form and can be packaged or unpackaged. For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Mobile communication" generally refers to any form of communication that uses cellular network standards to communicate between mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Outdoor" generally refers to the characteristic of being situated in open air so as to not be enclosed or otherwise covered by a building or other structure.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top deck upon which items are stacked, a bottom deck that rests on the ground, and a spacer structure positioned between the top and bottom decks to receive the forks of the forklift or pallet jack. However, the pallets can be configured differently. For example, the term pallet is used in a broader sense to include skids that have no bottom deck. One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, Calif.

Another example of a processor is an Application-Specific Integrated Circuit (ASIC). An ASIC is an Integrated Circuit (IC) customized to perform a specific series of logical operations is controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Satellite navigation" generally refers to a system that uses satellites to provide geo-spatial positioning data. In one example, the system may include a receiver that interacts with satellites using electromagnetic radiation. The timing of the transmission of the signal from the receiver to the satellites allows calculation of the position of the receiver using triangulation.

Some of examples of satellite navigation systems include global positioning systems such as GPS and GLONASS as well as global positioning systems under development such as Galileo. A satellite navigation system may also be a regional positioning system such as BeiDou, NAVIC, and QZSS.

"Short-range communication" generally refers to any network that is capable of transmitting data over short distances using high-frequency electromagnetic radiation. Some of examples of short-range communication protocols include, but are not limited to BLUETOOTH®, Wi-Fi, RFID, and ZigBee.

"Storage facility" generally refers to a location for keeping and/or storing items or goods. A storage facility may keep the items or goods indoors or outdoors. As an example, a storage facility may be a large building, such as a warehouse, or may be an outdoor area that is either open or enclosed by a fence or by another suitable method.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Transport structure" generally refers to any type of assembly or device that is able to move items or other objects. A transport structure may be designed to move a single object or may be capable of moving a group of objects. As an example a transport structure may be, but is not limited to, a pallet, skid, container, crate, carton, package, and/or bag.

"Wireless Personal Area Network" or "WPAN" generally refers to a low-powered electromagnetic network used for data transmission between devices, such as computers, telephones, electronics, and/or portable devices, that is carried over a short-distance using network technology with a range of a few centimeters to a few meters. WPAN is based in part on the IEEE 802.15 standard. Two types wireless technologies are typically used for WPAN, BLUETOOTH® and Infrared Data Association (IrDA) technologies. BLUETOOTH® technology typically uses short-range radio waves, and in some instances, can form longer range mesh networks. IrDA technology typically uses infrared light for communication. Non-limiting examples of WPAN include INSTEON, IrDA, Wireless USB, BLUETOOTH®, Z-Wave, and ZigBee wireless communication protocols and technologies.

It should be noted that the singular forms "a", "an", "the", and the like as used in the description and/or the claims include the plural forms unless expressly discussed otherwise. For example, if the specification and/or claims refer to "an article" or "the article" it includes one or more of such articles.

Again, it should be recognized that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A system, comprising:
    a transport structure configured to carry items;
    a tracking device coupled to the transport structure, the tracking device including
        a processor,
        a short-range communication module operatively connected to the processor,
        a satellite navigation module operatively connected to the processor, and
        a mobile communication module operatively connected to the processor;
    wherein the tracking device is configured to determine the location of the transport structure using the short-range communication module when the tracking device is within a storage facility;
    wherein the tracking device is configured to determine the location of the transport structure using the satellite navigation module when the tracking device is outside of the storage facility;
    wherein the processor is configured to use the mobile communication module to at least in part determine the location of the transport structure when the tracking device is outside of the storage facility and the satellite navigation module is unable to solely determine the location of the transport structure;
    wherein the processor is configured to determine that the transport structure is stationary within the storage facility using the short-range communication module; and
    wherein the tracking device is configured to communicate data at reporting intervals that increase when the transport structure is stationary within the storage facility.

2. The system of claim 1, wherein:
    the tracking device is configured to communicate via the short-range communication module when the tracking device is within the storage facility; and the tracking device is configured to communicate via the mobile communication module when the tracking device is outside of the storage facility.

3. The system of claim 1, wherein the tracking device is configured to determine the transport structure is stationary when differences between first and second location measurements are within a stationary geo-fence location error limit.

4. The system of claim 3, wherein:
the tracking device includes memory operatively connected to the processor; and
the processor is configured to cache data in a memory between the reporting intervals.

5. The system of claim 1, wherein:
the tracking device includes
a battery configured to supply sufficient energy to power the tracking device when the battery is at least at a minimum temperature,
a temperature sensor operatively connected to the processor configured to measure temperature, and
memory operatively connected to the processor;
the tracking device is configured to store data in the memory when the temperature measured by the temperature sensor is at or below the minimum temperature; and
the tracking device is configured to communicate the data stored in the memory when the temperature measured by the temperature sensor is greater than the minimum temperature.

6. The system of claim 1, wherein:
the tracking device includes an accelerometer operatively connected to the processor to measure the acceleration of the transport structure,
the accelerometer is able to measure acceleration within a measurement range; and
the tracking device is configured to detect a drop condition of the transport structure when the accelerometer is at or exceeds the measurement range of the accelerometer for at least two measurement intervals.

7. The system of claim 1, further comprising a server operatively connected to the tracking device over a network, wherein the server includes a cloud-based application for processing data from the tracking device.

8. The system of claim 7, wherein the cloud-based application is programmed to calculate the location of the transport structure from location data generated by the tracking device.

9. The system of claim 7, wherein the cloud-based application is configured to remotely enable or disable one or more features of the tracking device.

10. The system of claim 7, wherein the cloud-based application is configured to generate an alert when the tracking device is located outside a geo-fence.

11. The system of claim 1, further comprising:
a plurality of short-range communication beacons;
wherein the short-range communication module is configured to measure signal strength of the short-range communication beacons within range; and
wherein the processor of the tracking device is configured to determine the location of the transport structure based on the short-range communication beacons having highest signal strength.

12. The system of claim 11, wherein the processor is configured to triangulate the location of the transport structure based on at least three of the short-range communication beacons having the highest signal strength.

13. The system of claim 1, wherein the transport structure includes a pallet.

14. The system of claim 1, wherein the short-range communication module includes a Wireless Personal Area Network (WPAN) transceiver.

15. The system of claim 1, further comprising:
a content sensor attached to the transport structure, wherein the content sensor is configured to measure a load carried by the transport structure.

16. The system of claim 15, wherein the content sensor is a piezoelectric sensor.

17. The system of claim 16, wherein the piezoelectric sensor is configured to generate power for the tracking device.

18. A system, comprising:
a transport structure configured to carry items;
a tracking device coupled to the transport structure, the tracking device including
a processor,
a short-range communication module operatively connected to the processor,
a satellite navigation module operatively connected to the processor,
a mobile communication module operatively connected to the processor,
a battery configured to supply sufficient energy to power the tracking device when the battery is at least at a minimum temperature,
a temperature sensor operatively connected to the processor configured to measure temperature, and
memory operatively connected to the processor;
wherein the tracking device is configured to store data in the memory when the temperature measured by the temperature sensor is at or below the minimum temperature; and
wherein the tracking device is configured to communicate the data stored in the memory when the temperature measured by the temperature sensor is greater than the minimum temperature.

19. The system of claim 18, wherein:
the tracking device is configured to communicate via the short-range communication module when the tracking device is within a storage facility; and
the tracking device is configured to communicate via the mobile communication module when the tracking device is outside of the storage facility.

20. The system of claim 18, wherein:
the tracking device includes an accelerometer operatively connected to the processor to measure the acceleration of the transport structure,
the accelerometer is able to measure acceleration within a measurement range; and
the tracking device is configured to detect a drop condition of the transport structure when the accelerometer is at or exceeds the measurement range of the accelerometer for at least two measurement intervals.

21. The system of claim 18, further comprising a server operatively connected to the tracking device over a network, wherein the server includes a cloud-based application for processing data from the tracking device.

22. The system of claim 18, further comprising:
a plurality of short-range communication beacons;
wherein the short-range communication module is configured to measure signal strength of the short-range communication beacons within range; and
wherein the processor of the tracking device is configured to determine the location of the transport structure based on the short-range communication beacons having highest signal strength.

23. The system of claim 18, further comprising:
a content sensor attached to the transport structure, wherein the content sensor is configured to measure a load carried by the transport structure.

24. A system, comprising:
a pallet configured to carry items, wherein the pallet includes opposing decks separated by a spacer structure that includes a spacer support;
a tracking device attached to the spacer support of the pallet, the tracking device including
a processor,
a short-range communication module operatively connected to the processor,
a satellite navigation module operatively connected to the processor, and
a mobile communication module operatively connected to the processor;
wherein the tracking device is configured to determine the location of the pallet using the short-range communication module when the tracking device is within a storage facility;
wherein the tracking device is configured to determine the location of the pallet using the satellite navigation module when the tracking device is outside of the storage facility; and
wherein the processor is configured to use the mobile communication module to at least in part determine the location of the pallet when the tracking device is outside of the storage facility and the satellite navigation module is unable to solely determine the location of the pallet.

25. The system of claim 24, wherein the tracking device is configured to communicate data at reporting intervals that increase when the pallet is stationary.

26. The system of claim 25, wherein the tracking device is configured to determine the pallet is stationary when differences between first and second location measurements are within a stationary geo-fence location error limit.

27. The system of claim 24, wherein:
the tracking device is configured to communicate via the short-range communication module when the tracking device is within the storage facility; and
the tracking device is configured to communicate via the mobile communication module when the tracking device is outside of the storage facility.

28. The system of claim 24, wherein:
the tracking device includes an accelerometer operatively connected to the processor to measure the acceleration of the pallet,
the accelerometer is able to measure acceleration within a measurement range; and
the tracking device is configured to detect a drop condition of the pallet when the accelerometer is at or exceeds the measurement range of the accelerometer for at least two measurement intervals.

29. The system of claim 24, further comprising a server operatively connected to the tracking device over a network, wherein the server includes a cloud-based application for processing data from the tracking device.

30. The system of claim 29, wherein the cloud-based application is programmed to calculate the location of the pallet from location data generated by the tracking device.

31. The system of claim 24, further comprising:
a plurality of short-range communication beacons;
wherein the short-range communication module is configured to measure signal strength of the short-range communication beacons within range; and
wherein the processor of the tracking device is configured to determine the location of the pallet based on the short-range communication beacons having highest signal strength.

32. The system of claim 24, further comprising:
a content sensor attached to the pallet, wherein the content sensor is configured to measure a load carried by the pallet.

33. A system, comprising:
a transport structure configured to carry items;
a tracking device coupled to the transport structure, the tracking device including
a processor,
a short-range communication module operatively connected to the processor,
a satellite navigation module operatively connected to the processor, and
a mobile communication module operatively connected to the processor;
wherein the tracking device is configured to determine the location of the transport structure using the short-range communication module when the tracking device is within a storage facility;
wherein the tracking device is configured to determine the location of the transport structure using the satellite navigation module when the tracking device is outside of the storage facility;
wherein the processor is configured to use the mobile communication module to at least in part determine the location of the transport structure when the tracking device is outside of the storage facility and the satellite navigation module is unable to solely determine the location of the transport structure; and
a content sensor attached to the transport structure, wherein the content sensor is configured to measure a load carried by the transport structure;
wherein the content sensor is configured to determine when the transport structure is empty; and
wherein the tracking device is configured to conserve power when the content sensor signals that the transport structure is empty.

34. The system of claim 33, wherein the content sensor is a piezoelectric sensor.

35. The system of claim 34, wherein the piezoelectric sensor is configured to generate power for the tracking device.

* * * * *